(12) United States Patent
Harding et al.

(10) Patent No.: US 11,375,799 B2
(45) Date of Patent: Jul. 5, 2022

(54) EYELID COVERING AND STABILIZATION FOR AUTOMATIC EYELASH EXTENSION

(71) Applicant: WINK ROBOTICS, Oakland, CA (US)

(72) Inventors: Nathan Harding, Oakland, CA (US); Kurt Amundson, Berkeley, CA (US); Michael Muller, Augsburg (DE); Kyle Andrew Tucker, Hendersonville, NC (US); Michelle Warner, Burlingame, CA (US); Richard W. O'Connor, Redwood City, CA (US)

(73) Assignee: Wink Robotics, Oakland, CA (US)

( * ) Notice: Subject to any disclaimer, the term of this patent is extended or adjusted under 35 U.S.C. 154(b) by 446 days.

(21) Appl. No.: 16/461,205

(22) PCT Filed: Nov. 16, 2017

(86) PCT No.: PCT/US2017/061897
§ 371 (c)(1),
(2) Date: May 15, 2019

(87) PCT Pub. No.: WO2018/093970
PCT Pub. Date: May 24, 2018

(65) Prior Publication Data
US 2019/0269222 A1 Sep. 5, 2019

Related U.S. Application Data

(60) Provisional application No. 62/423,000, filed on Nov. 16, 2016.

(51) Int. Cl.
*A45D 44/00* (2006.01)
*A41G 5/02* (2006.01)
(Continued)

(52) U.S. Cl.
CPC .............. *A45D 44/00* (2013.01); *A41D 13/11* (2013.01); *A41D 13/1169* (2013.01);
(Continued)

(58) Field of Classification Search
CPC ...... A45D 44/002; A45D 44/12; A45D 40/30; A41G 5/02
See application file for complete search history.

(56) References Cited

U.S. PATENT DOCUMENTS 4,784,165 A 11/1988 Stein et al.
5,803,076 A 9/1998 Myers
(Continued)

FOREIGN PATENT DOCUMENTS

CN 102711553 10/2012

*Primary Examiner* — Cris L. Rodriguez
*Assistant Examiner* — Brianne E Kalach
(74) *Attorney, Agent, or Firm* — Diederiks & Whitelaw, PLC

(57) ABSTRACT

A device for providing safety during the process of installing eyelash extensions onto the natural eyelashes of a subject, especially when the installation is automatic. In some embodiments, the placing of extensions is carried out by a robotic mechanism utilizing computer vision, and in some embodiments, a barrier is created between the robotic mechanism and the subject in order to protect the subject in the event of a malfunction.

18 Claims, 24 Drawing Sheets

(51) Int. Cl.
*A45D 40/30* (2006.01)
*B25J 9/16* (2006.01)
*B25J 11/00* (2006.01)
*G06K 9/62* (2022.01)
*A41D 13/11* (2006.01)
*A41G 3/00* (2006.01)
*B05B 13/04* (2006.01)
*B25J 15/00* (2006.01)
*B25J 18/06* (2006.01)
*B25J 19/06* (2006.01)
*G06T 7/70* (2017.01)
*B25J 9/02* (2006.01)
*B25J 9/04* (2006.01)
*G06V 10/42* (2022.01)
*G06V 40/16* (2022.01)
*A45D 29/00* (2006.01)
*B25J 9/10* (2006.01)

(52) U.S. Cl.
CPC ............ *A41D 13/1184* (2013.01); *A41G 3/00* (2013.01); *A41G 5/02* (2013.01); *A45D 40/30* (2013.01); *B05B 13/0431* (2013.01); *B25J 9/023* (2013.01); *B25J 9/043* (2013.01); *B25J 9/1615* (2013.01); *B25J 9/1676* (2013.01); *B25J 9/1679* (2013.01); *B25J 9/1697* (2013.01); *B25J 11/008* (2013.01); *B25J 11/0075* (2013.01); *B25J 15/0019* (2013.01); *B25J 18/06* (2013.01); *B25J 19/06* (2013.01); *G06K 9/6256* (2013.01); *G06K 9/6262* (2013.01); *G06T 7/70* (2017.01); *G06V 10/42* (2022.01); *G06V 40/171* (2022.01); *A45D 29/00* (2013.01); *A45D 2044/007* (2013.01); *B25J 9/1045* (2013.01); *B25J 9/1694* (2013.01); *G06T 2207/10012* (2013.01); *G06T 2207/30201* (2013.01)

(56) References Cited

U.S. PATENT DOCUMENTS

| | | | |
|---|---|---|---|
| 7,600,519 B2 | 10/2009 | Dinh | |
| 7,632,378 B2 | 12/2009 | Sakurai et al. | |
| 8,113,218 B2 | 2/2012 | Nguyen | |
| 8,127,774 B2 | 3/2012 | Dinh | |
| 8,396,598 B2 | 3/2013 | Sutherland et al. | |
| 8,439,043 B2 | 5/2013 | Davis | |
| 8,464,733 B2 | 6/2013 | Franklin et al. | |
| 8,701,685 B2 | 4/2014 | Chipman | |
| 8,899,242 B2 | 12/2014 | Wong | |
| 8,911,453 B2 | 12/2014 | Tenney et al. | |
| 8,967,158 B2 | 3/2015 | Sanbonmatsu | |
| 9,043,025 B2 | 5/2015 | Brooks et al. | |
| 9,179,723 B1 * | 11/2015 | Yoo .................... A41G 5/02 | |
| 9,427,562 B2 | 8/2016 | Blacker | |
| 2007/0006748 A1 * | 1/2007 | Liu ..................... A45D 40/30 | |
| | | | 101/127 |
| 2007/0295352 A1 * | 12/2007 | Dinh .................. A41G 5/02 | |
| | | | 132/200 |
| 2010/0018545 A1 * | 1/2010 | Franklin ............. A45D 40/30 | |
| | | | 132/319 |
| 2011/0298579 A1 | 12/2011 | Hardegger et al. | |
| 2012/0192330 A1 | 8/2012 | McMullen | |
| 2013/0146076 A1 | 6/2013 | Dunaway | |
| 2014/0158147 A1 * | 6/2014 | Butcher .............. A45D 40/30 | |
| | | | 132/319 |
| 2014/0261430 A1 | 9/2014 | Davis | |
| 2014/0261514 A1 | 9/2014 | Martins et al. | |
| 2015/0128986 A1 * | 5/2015 | Stookey ............. A41G 5/02 | |
| | | | 132/216 |
| 2016/0000606 A1 | 1/2016 | Spier | |
| 2016/0051033 A1 * | 2/2016 | Abraham ........... A45D 40/30 | |
| | | | 132/200 |
| 2016/0107314 A1 | 4/2016 | Takemoto et al. | |

\* cited by examiner

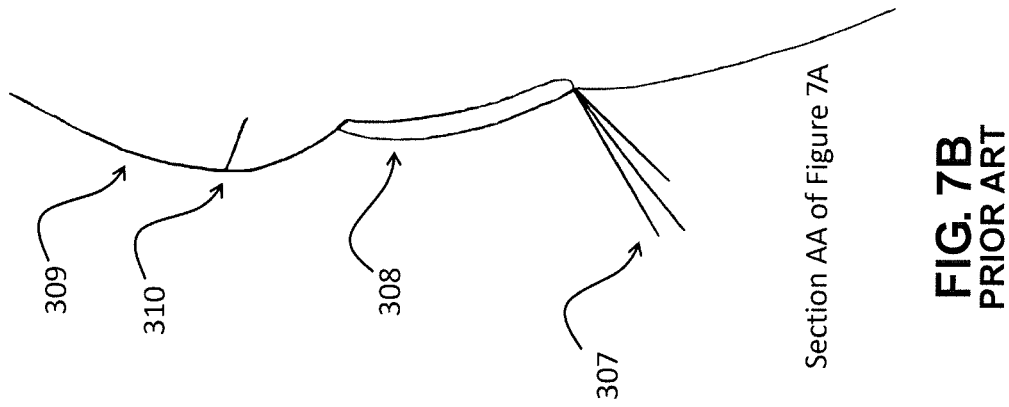
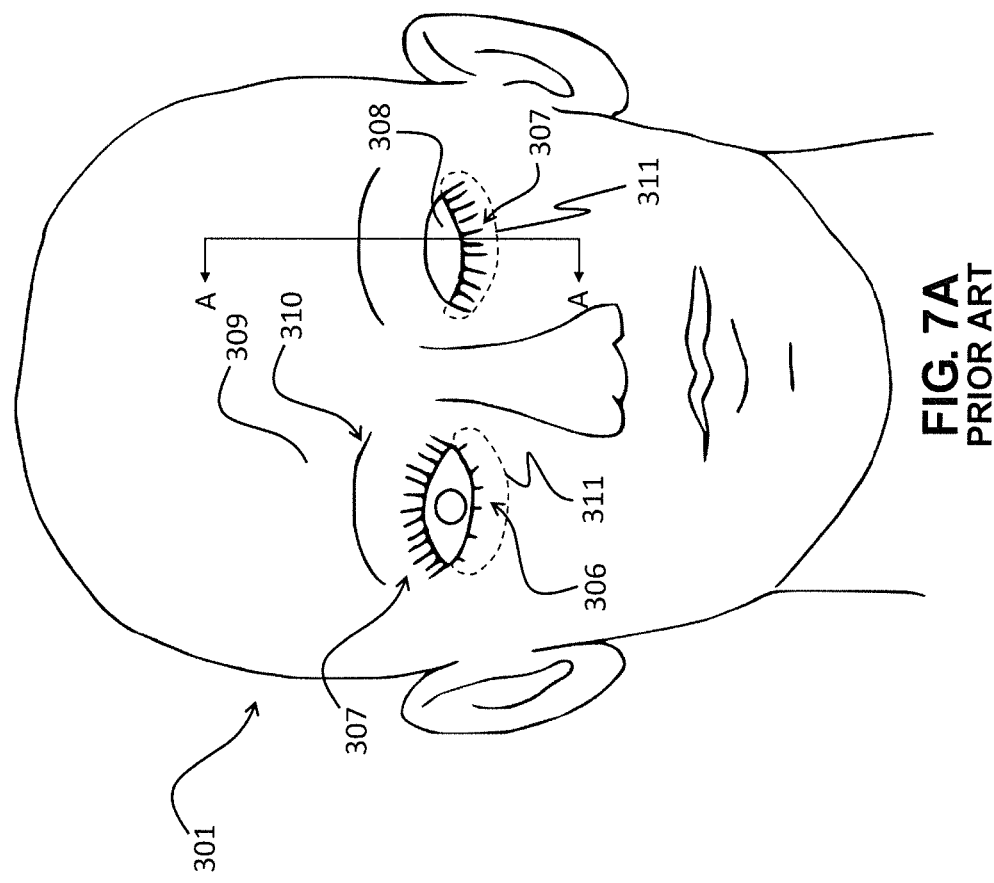

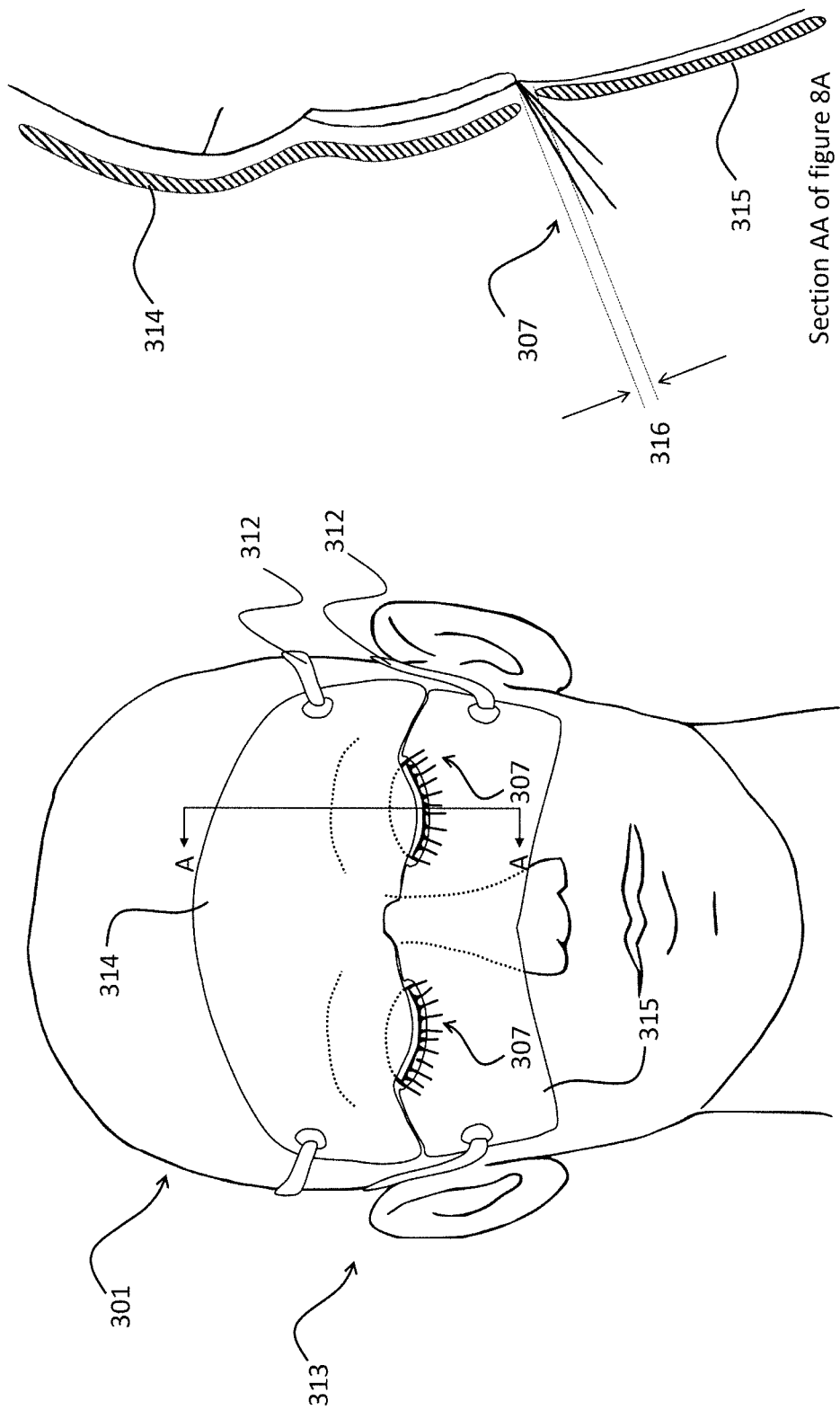

Section AA of figure 13

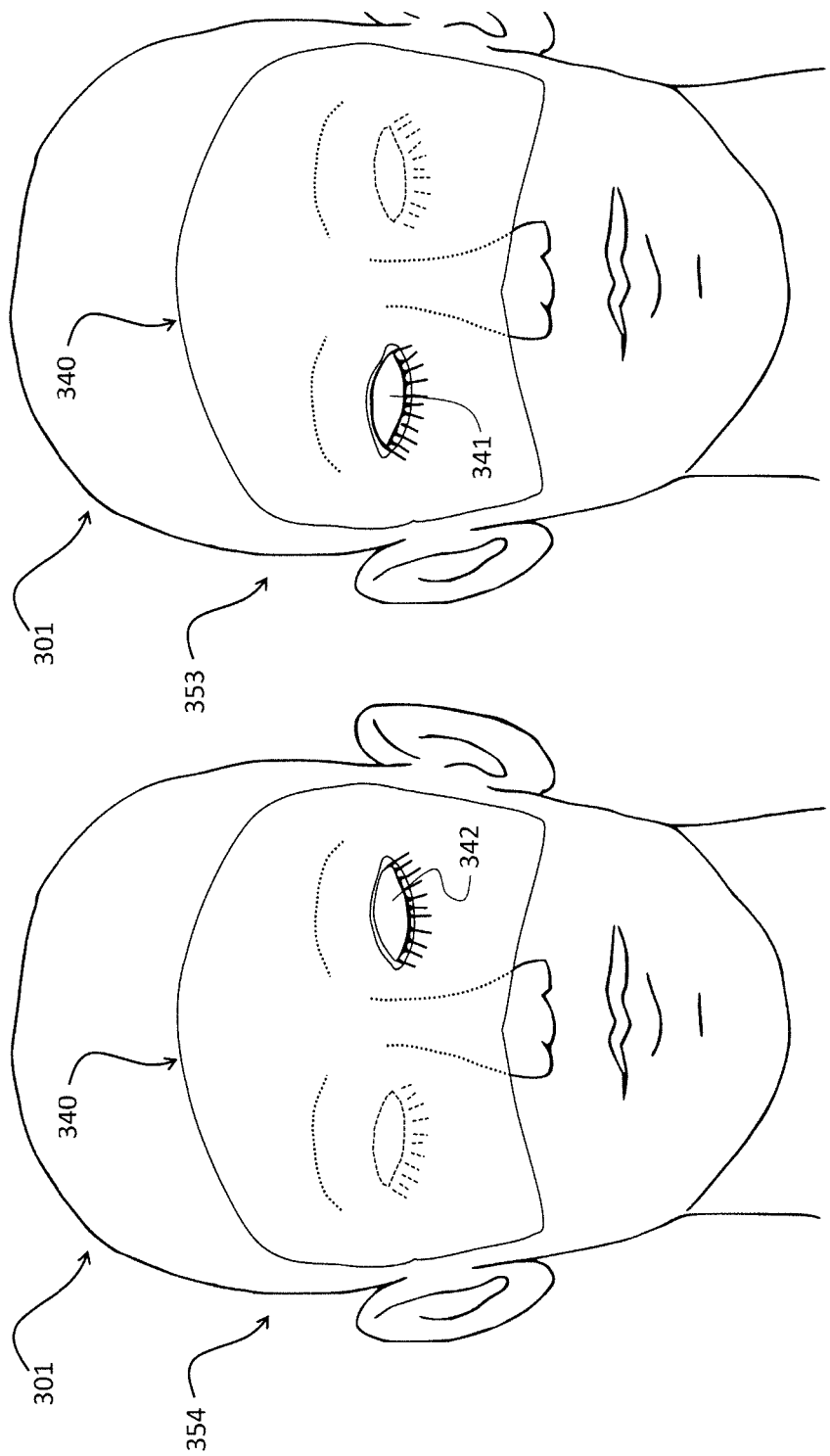

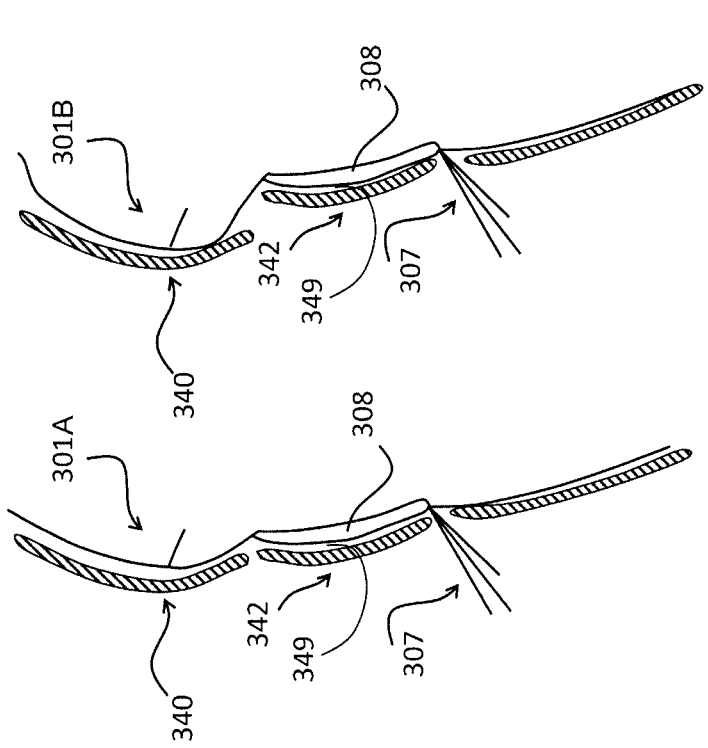
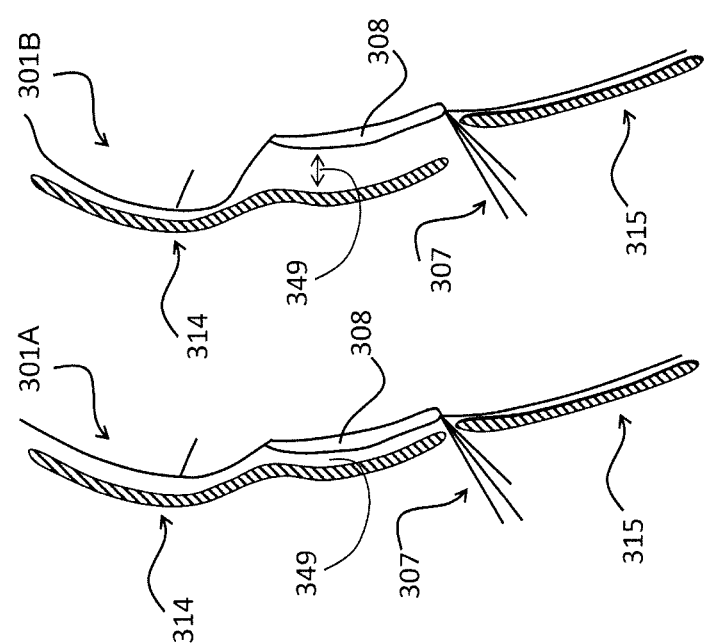

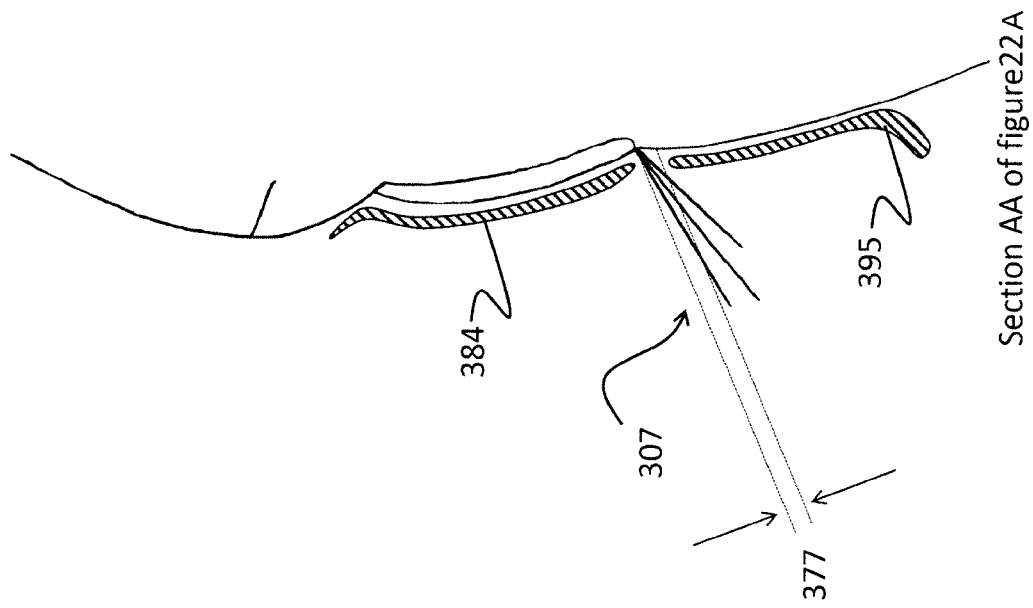
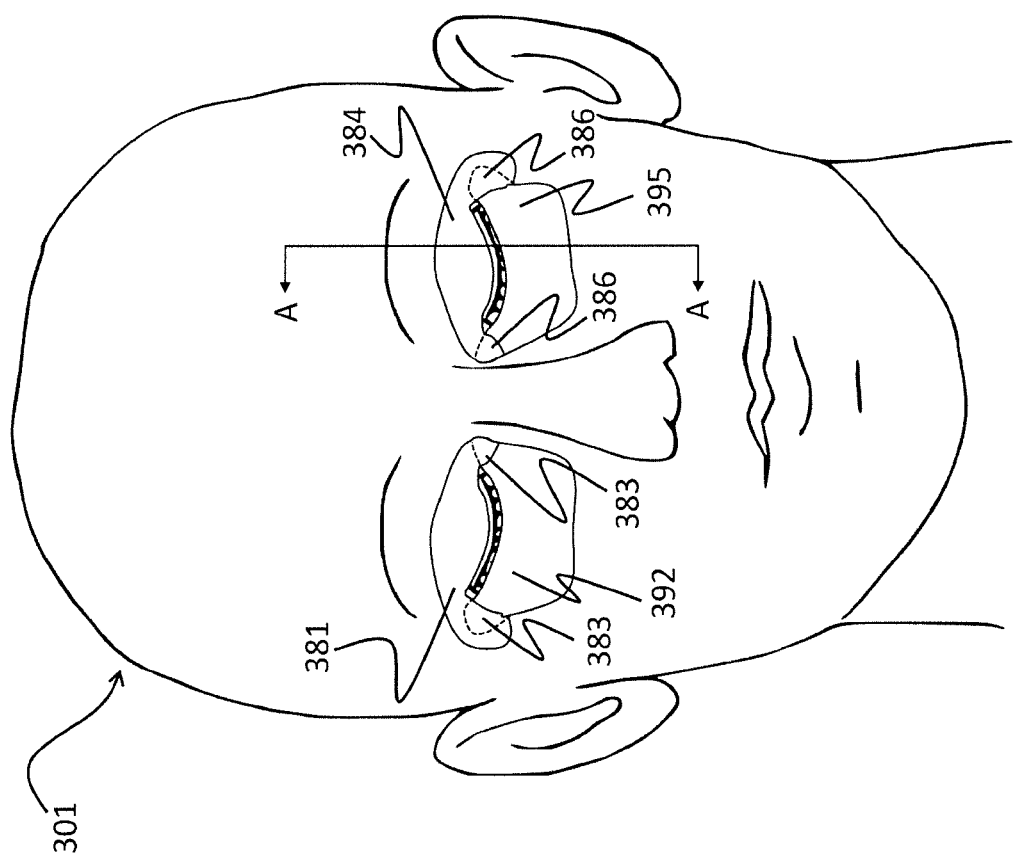

EYELID COVERING AND STABILIZATION FOR AUTOMATIC EYELASH EXTENSION

CROSS-REFERENCE TO RELATED APPLICATIONS

This application represents the U.S. National Phase of International Application number PCT/US2017/061897, filed on Nov. 16, 2017 and titled "Eyelid Covering and Stabilization for Automatic Eyelash Extension" which claims the benefit of U.S. Provisional Application No. 62/423,000, which was filed on Nov. 16, 2016 and titled "Machine for Beauty Salon". The entire contents of these applications are incorporated herein by reference.

FIELD OF THE INVENTION

The invention relates to the process of automatically applying eyelash extensions.

BACKGROUND OF THE INVENTION

Eyelash extensions are increasing in popularity all over the world. Eyelash extensions are usually differentiated from what is called an "artificial eyelash" or an "artificial eyelash structure" by the fact that they are affixed one to one to a natural eyelash fiber. An "artificial eyelash" is a complete set of eyelash fibers (usually for one eye) that is connected to a backing material (a thin strip at the proximal end of the eyelash fibers), which is affixed to the eyelid. This process is therefore simpler and is provided for home use. Eyelash extensions, however, are laboriously glued, usually with a cyanoacrylate adhesive, to each natural eyelash fiber one at a time by a beauty technician. Extensions may have branches, such as shown in U.S. Pat. No. 8,127,774, and there are some schemes for interlocking with nearby eyelashes, such as disclosed in U.S. Pat. No. 8,113,218.

When eyelash extensions are applied for the first time, the appointment can take a considerable amount of time, lasting up to two hours. During an appointment, each eyelash extension must be picked up in the proper orientation with tweezers, dipped in adhesive, and then placed against one of the subject's natural eyelash fibers until adhesion occurs. Because this large amount of labor costs beauty salons money, and because the length of time required and cost deters some customers, there have been some labor-saving devices proposed. One such device is a dispenser for eyelashes that is held in the hand, disclosed in U.S. Patent Application Publication No. 2014/0261514. There have also been labor saving proposals regarding the trays on which the extensions come from the factory, such as can be seen in U.S. Pat. No. 8,701,685. These trays are intended to combat the fact that it is not only the adhesion step of the process which is difficult for humans. Just picking the eyelash extensions up with a pair of tweezers is challenging. Also, it has been proposed that the handling of adhesive and the step of dipping the extension into adhesive can be eliminated by providing each extension with a pre-installed piece of heat shrink tubing which is used to affix the extension to the natural eyelash fiber.

There is a need, therefore, for a way to more effectively install eyelash extensions, which would reduce both the time and the cost of doing so. Furthermore, there is a need that such a system be demonstrably safe so that the recipient of the extensions is confident in the procedure. The invention described here applies to all eyelash extensions, whether branched, interlocked, or otherwise, and to all methods of adhesion to the natural eyelash, whether by adhesive, heat shrink tubing, or otherwise.

SUMMARY OF THE INVENTION

The installation of eyelash extensions can be automated with robotic mechanisms that place the extension without requiring manual application by a human. Unless, however, extremely expensive and complex fail-safe robotic mechanisms are used, a safety system should be provided to ensure the safety of the extension process in the event of a robotic malfunction. The subject of this invention is a series of shutters and masks that can be used in conjunction with a robotic eyelash extension system in order to provide safety. Some embodiments are related to shutters that are integral to the robotics, which allow only insertion of the eyelash into a robotic enclosure. In other embodiments of the invention, a mask is fixed to the human subject, allowing only the subject's eyelashes through the mask, with the robot being positioned next to or registered to the mask.

Additional objects, features and advantages of the invention will become more readily apparent from the following detailed description of preferred embodiments thereof when taken in conjunction with the drawings wherein like reference numerals refer to common parts in the several views.

BRIEF DESCRIPTION OF THE DRAWINGS

FIG. 7A is a front view of the face of the subject.

FIG. 7B is a cross section of the face of the subject.

FIG. 8A is a front view of a two-part mask embodiment.

FIG. 8B is a cross section of the two-part mask embodiment.

FIG. 15A shows a left mask of an embodiment having distinct left and right masks.

FIG. 15B shows a right mask of the embodiment having distinct left and right masks.

FIG. 16A is a cross section of the two-park mask.

FIG. 16B is another cross section of the two-part mask.

FIG. 16C is a cross section of the three-part mask.

FIG. 16D is another cross section of the three-part mask.

FIG. 22A is a front view of an adhesive mask similar to that of FIGS. 21A and B, further including larger lower masks.

FIG. 22B is a cross section of the adhesive mask of FIG. 22A.

DETAILED DESCRIPTION OF THE INVENTION

The following description sets forth numerous specific configurations, parameters, and the like. It should be recognized, however, that such description is not intended as a limitation on the scope of the present invention but is instead provided as a description of exemplary embodiments.

In the following description, when the term "eyelash" is used, it is meant to refer to one or more natural eyelash fibers of a person. When the term "eyelash extension" or "extension" is used, it is meant to refer to an artificial eyelash extension.

The invention disclosed herein relates to a series of shutters or masks that can be used in conjunction with an automatic eyelash extension robotic mechanism to provide greater safety for the subject, simplification of the design of the robot, and potentially increased speed in the application of the extensions. This safety can be provided by shutters that are part of the robotic enclosure and permit the robot to access only the eyelash of the person that protrudes though the shutters and into the robotic enclosure. The safety can also be provided by a mask that is affixed to the subject and permits only the eyelash of the person to protrude beyond the mask. In that case, the robot enclosure can have a larger opening that can interface with the mask. In either embodiment, each of which will be discussed in turn, restricting the access of the robot to just the eyelash of the subject enhances the safety of the subject. It should be further noted that there are other solutions for providing safety that are otherwise disclosed outside of this application. In some embodiments, multiple approaches to safety can be combined, while in other embodiments a single of these approaches may be sufficient to provide safety for the subject.

Robotic Eyelash Extension and Shutters

Figure 1:
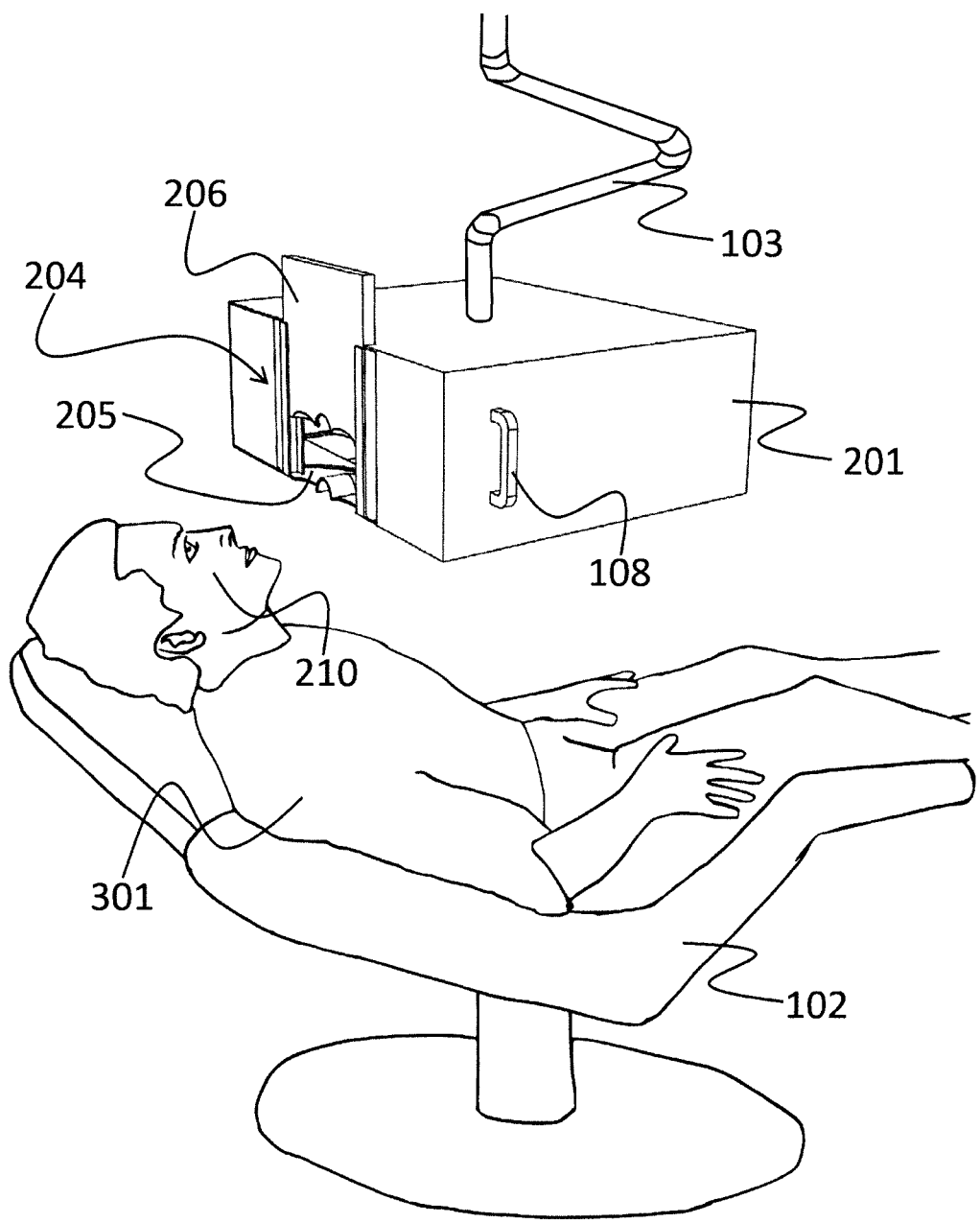
FIG. 1 shows the basic external features of an embodiment of the invention.

FIG. 1 is an external view of a robotic eyelash extension system which illustrates the basic external features of such a system. While the robotic mechanism is not the subject of this specification, it is helpful to describe it in broad terms to contextualize the safety inventions discussed below. The system has an external enclosure 201 which is intended to protect a subject 301 and a user (the word "subject" will be used to denote the person who is receiving the eyelash extensions, while the word "user" will be used to denote the person who is operating the equipment, usually, but not necessarily a beauty technician). Subject 301 reclines on a chair 102 much like the chair in a dentist office or more appropriately, the type of beauty salon chair that can recline as is often done in order to wash a subject's hair. Enclosure 201 is attached to the floor, ceiling, or chair by an arm 103 which is used to position enclosure 201 against the face of subject 301 so that the robotic mechanism inside will have access to the eyelashes of subject 301. Arm 103 can take many forms (and can even be just a cart that rolls enclosure 201 above subject 301 and has an easy way to set the distance from the floor to enclosure 201), but here arm 103 is meant to be portrayed as the arm typically used in the dental office to position various tools such as an x-ray device. Arm 103 can include a pantograph mechanism (not shown) like the ones used in dental offices to keep the dentist's instrument table level at all times as it is moved easily to various positions. The system in FIG. 1 also shows a window 204 which is comprised of an opening and shutters (a lower shutter 205 and an upper shutter 206). Shutters 205 and 206 can be positioned by the user so that there is only a small slit through which the eyelashes of subject 301 extend. Shutters 205 and 206 are intended to be constructed of a material sufficient in rigidity to protect subject 301 from the robotic mechanism within enclosure 201 in the event of a malfunction. Window 204 and shutters 205 and 206 have been exaggerated in size here for clarity. Experts in robotics will note that it is possible to create a robot that is inherently safe and would therefore make shutters 205 and 206 superfluous in such designs. Such designs are not the subject of this invention but are discussed in other related applications. Shutters 205 and 206 can also be made to be easily removable so that they can be changed between subjects. Shutters 205 and 206 can be designed in such a way that they are disposable or easily cleaned in order to maintain good hygiene.

The robotic mechanism used is described in other related applications and need not be discussed in great detail. However, it is important to understand that a robotic mechanism for eyelash extension comprises a small robotic manipulator and gripper than can position an eyelash extension accurately alongside a natural eyelash. Doing so also involves, in general, a vision system so that the robotic mechanism can guide itself to a natural human eyelash. This is important because any safety shutter or mask should not excessively obscure the view of the natural eyelashes. Finally, it is important to note that, in general, eyelash extensions are very light and a very weak robot can manipulate them. This means that the robotic mechanism is not very strong compared to large industrial robots, and it can be practical to have very light protection in order to provide safety to the subject.

Figure 2:
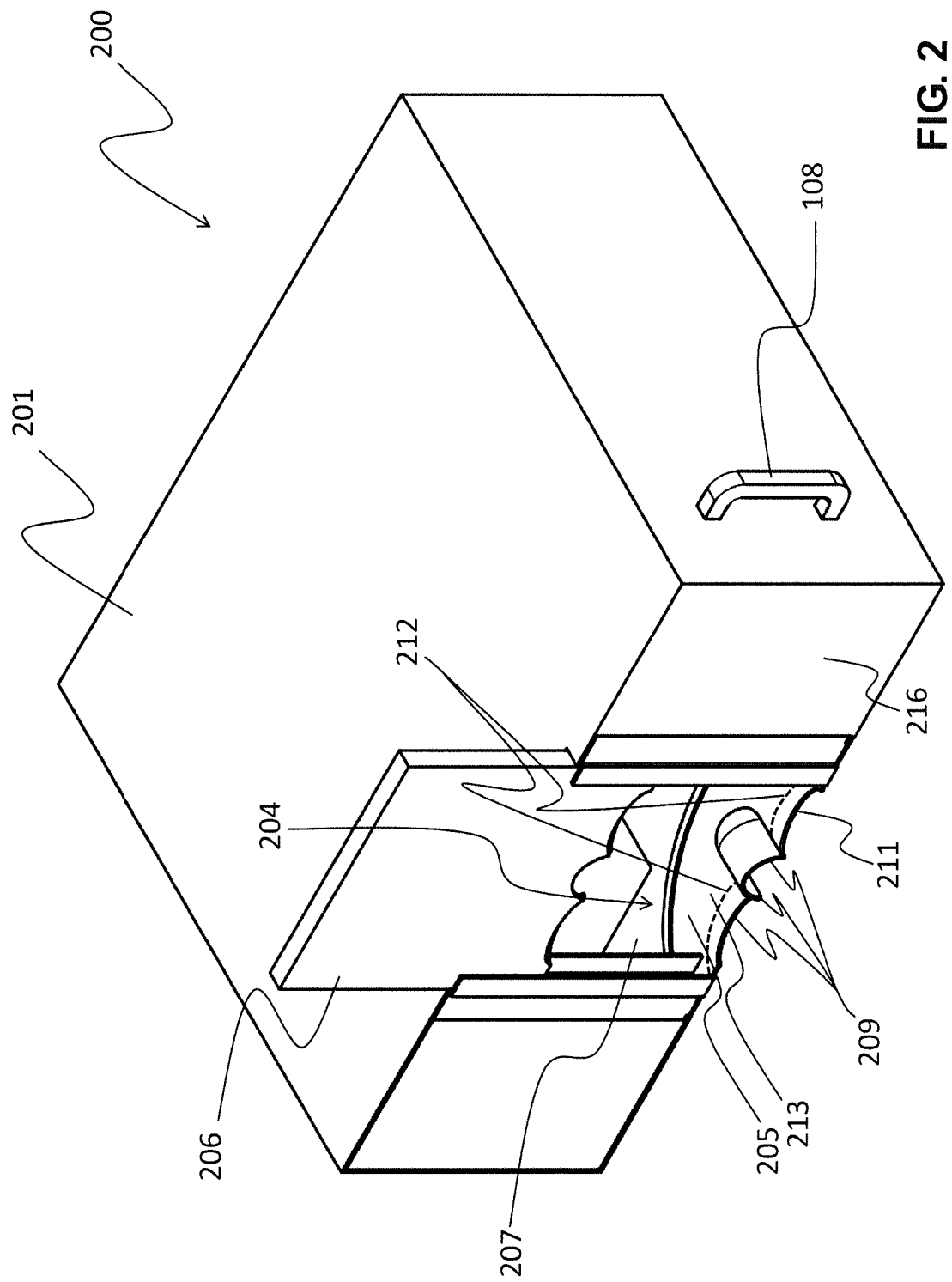
FIG. 2 shows the external features of an enclosure of an embodiment of the invention.

FIG. 2 shows some detail of the enclosure of a preferred embodiment. In this embodiment, enclosure 201 has window 204 with lower shutter 205 and upper shutter 206. Lower shutter 205 clips into position into a floor 207 of enclosure 201. Lower shutter 205 is made to fit the profile of a subject's face and can be provided in multiple sizes like small, medium, and large with corresponding matching sized versions of upper shutter 206 if desired. In some embodiments, for example, where more sizes are desired to fit subject 301, extra-small and extra-large can be provided. Conversely, in some embodiments where fewer sizes are desired, for example, only a small and large can be provided. Lower shutter 205 is designed to butt comfortably up to the face of subject 301 and therefore has rounded edges 209 in areas where it can touch the face of subject 301. Upper shutter 206 is likewise designed with rounded edges 209 in all locations where it would come in contact with subject 301 though, in proper operation, upper shutter 206 should only contact subject 301 on the distal edge of the eyelid if at all.

Figure 3:
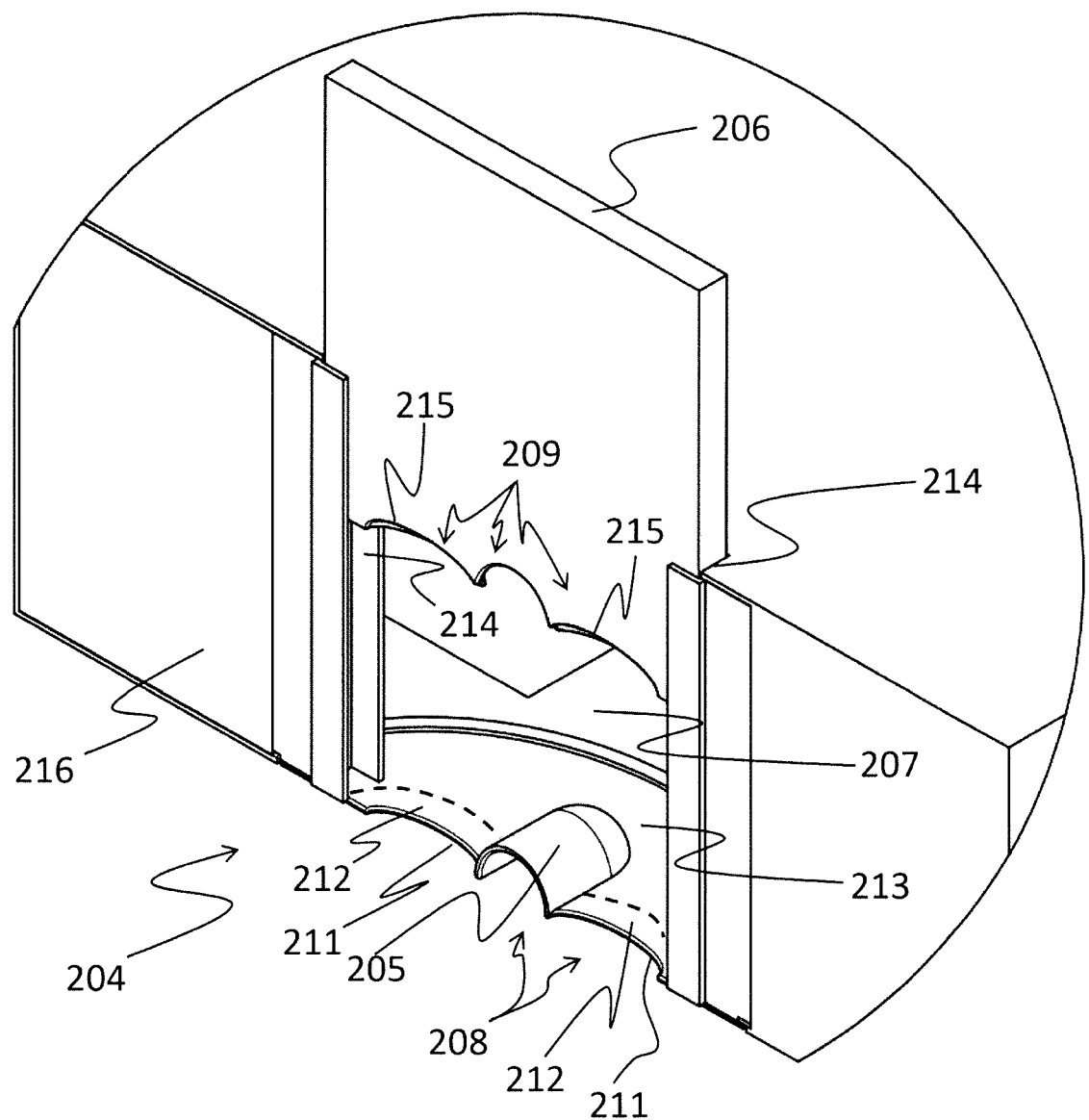
FIG. 3 shows a detailed view of a window.
Figure 4:
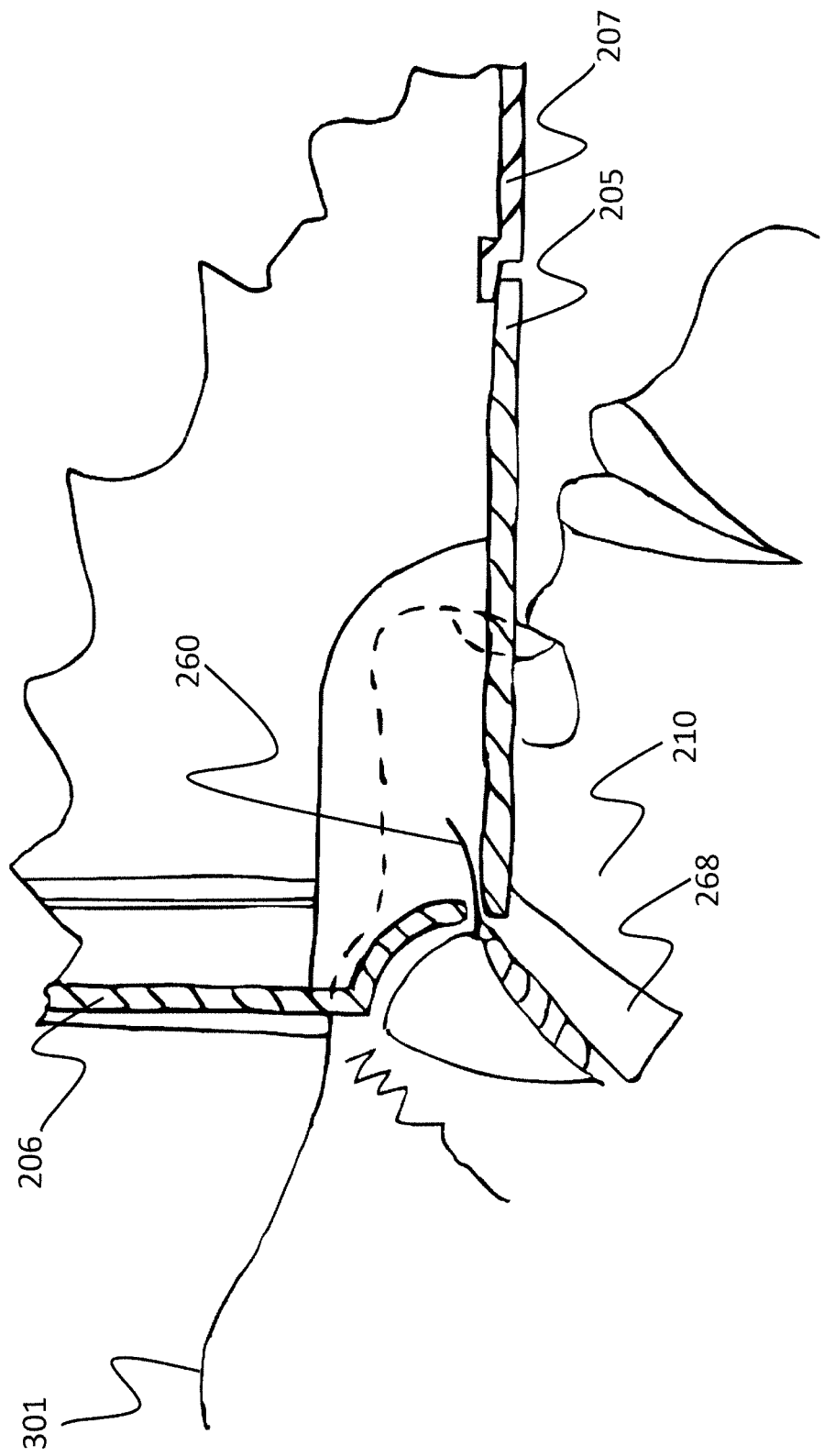
FIG. 4 shows a cross section of window shutters properly installed over a subject's eye.

FIG. 3 shows a detailed view of window 204. In practice, subject 301 is laid back in chair 102 in a reclining position. Subject 301's lower eyelashes can then be taped down to their cheeks 210 with adhesive tape 268 if the user prefers (as shown in FIG. 4) in order to ensure that there is no possibility of the lower eyelash entering the access slot between shutters 205 and 206. A new or clean lower shutter 205 is then installed into the floor 207 of enclosure 201. Then, enclosure 201 is moved in multiple directions on arm 103 using a handle 108 (see FIG. 2) in order to position it such that an eye profile 211 of lower shutter 205 is resting just on top of the lower eyelash taped to cheek 210 of subject 301. When this is accomplished, subject 301 can open and close their eyes until their upper eyelashes are resting on top of eye profile 211 in a working region 212 (which extends from the dashed line shown to eye profile 211) on an upper surface 213 of lower shutter 205. At this point, a new or clean upper shutter 206 of the proper size can be inserted in an upper shutter installation slot 214 and pushed down to a point where its eye profile 215 is just above lower shutter eye profile 211. FIG. 4 shows a partial cross section of the device once shutters 205 and 206 are in position. It can be seen that a natural upper lid eyelash 260 of subject 301 is above lower shutter 205.

Sensors can be used to sense the positions of shutters 205 and 206 to confirm that they are installed in the proper position (and remain so) during operation. Such sensors can be simple optical sensors or mechanical switches in the slots where shutters 205 and 206 are mounted, such as upper shutter installation slot 214. In the preferred embodiment, shutters 205 and 206 are made of a plastic which is incompatible with the adhesive used between the extensions and the natural eyelash fibers in order to ensure that there is no possibility of accidental adhesion of an eyelash to shutters 205 and 206. One skilled in the art will note that the shutters shown here are simplified so that lower shutter eye profile 211 lies in the plane of the enclosure floor 207. In fact, it can be advantageous to create a more complicated three-dimensional lower shutter 205 in order to have the eye profile curve be in the optimal plane for the subject's comfort.

The intent of shutters 205 and 206 shown in this embodiment is to illustrate the general concept of creating an enclosure for a robotic mechanism which acts to isolate subject 301 from the motion of the robotic mechanism. Since bringing shutters 205 and 206 together results in forming a small slot through which only the eyelashes protrude, subject 301 can feel comfortable that the robot can only touch their eyelashes, and not their eyes.

Masks

Figure 5:
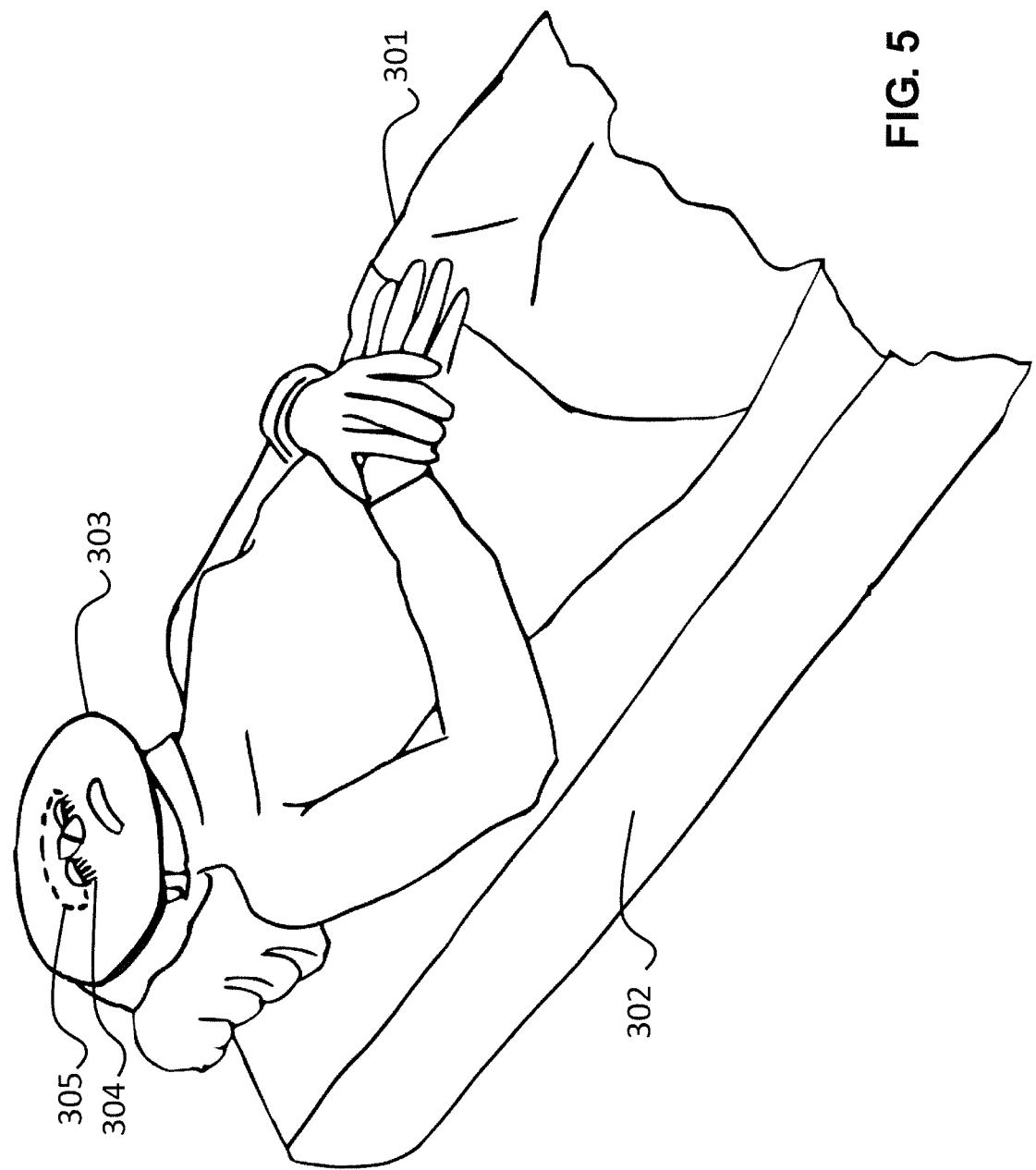
FIG. 5 shows a mask-type barrier which can be used as a substitute for the shutters.
Figure 6:
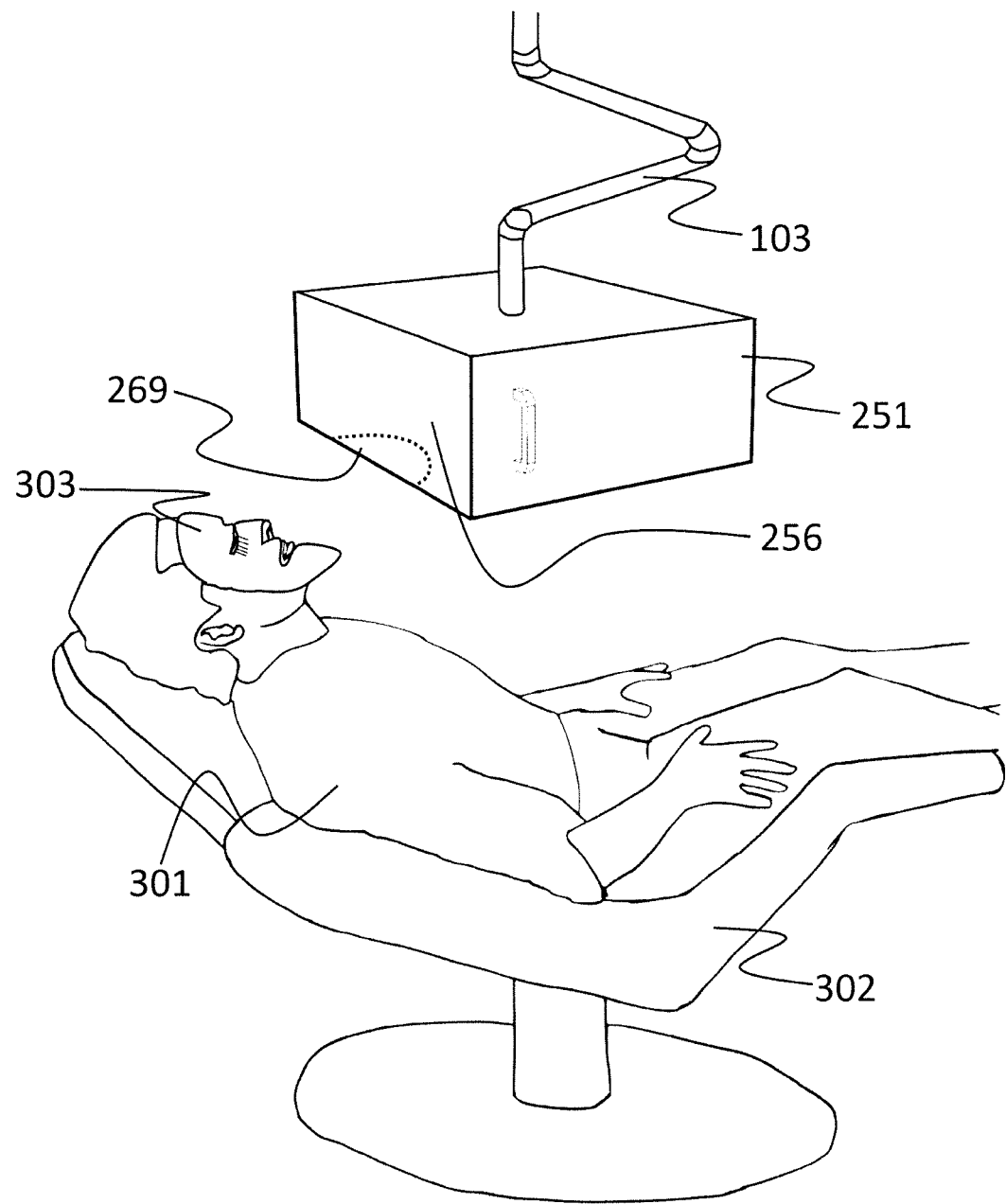
FIG. 6 shows a mask-type barrier in relation to the enclosure.

In some embodiments, a mask-type barrier is used to cover the face of subject 301, providing safety and comfort to subject 301 because the robot can only touch their eyelashes and not their eyes. This approach is somewhat analogous to that of shutter 205 and 206 discussed above, but the mask would generally be fixed to subject 301 rather than shutters 205 and 206 being part of enclosure 201. FIG. 5 shows subject 301 in preparation for getting eyelash extensions from a slightly different embodiment of the invention that uses such a mask-type barrier. In FIG. 5, subject 301 lays on a table 302. Laid on the face of subject 301 is a mask 303. Mask-type barrier 303 is made of a rigid or semi rigid plastic that is not compatible with the adhesive to be used and has two slots 304 from which the subject's upper eyelashes protrude in an upward direction. As further shown in FIG. 6, an embodiment that utilizes this mask-type barrier 303 is similar to the embodiment of FIGS. 1-4 in most ways except that instead of window 204 on a front face 256 of an alternative enclosure 251, front face 256 would not have an opening. Instead, there is a window 269 in the floor of alternative enclosure 251 which would allow the robotic mechanism inside to gain access to the working area of mask. If the size of mask 303 is larger than the opening, it is not necessary to have mask 303 mate with alternative enclosure 251 at all, although mask 303 can mate to enclosure 251 if desired by clicking into some features on the bottom of enclosure 251 or by being sucked into contact by a vacuum source or magnets. However, in the preferred embodiment, mask 303 requires no features to mate it to the bottom of alternative enclosure 251; mask 303 simply protects subject 301 in all circumstances because mask 303 is larger than the opening in the bottom of enclosure 251. This is why mask 303 is drawn in what looks to be an oversized shape. It is important to note that mask 303 can be constructed of two pieces to make it easier for the eyelashes to be inserted through slots 304. For example, the region denoted by a dotted line 305 can be a separate component that is clicked into mask 303 after the procedure described in connection with FIG. 3 is followed to get the upper eyelashes of subject 301 on top of the working area of mask 303. Also, it is important to note that, with this strategy, mask 303 can be provided in many generic sizes, or mask 303 can even be made out of an easily formable material such that it is customizable for the subject. Such materials are now commonly used to form the sockets of prosthetic legs and arms. Lastly, it is important to note that the design is predicated on the idea that the robotic mechanism is not strong enough to hurt the person despite the mask. That is, a very large industrial robot could punch through a mask or deliver so much force that subject 301 could be hurt even if the force is spread over the mask. In general, however, there is no need for such a large and forceful robotic mechanism to be used, nor for the robot itself to be particularly close to subject 301 (e.g., any large robot comprising part of the robotic mechanism can be well back from subject 301 with a force limiting clutch between the robot and the end effector).

There are many specialized embodiments of the mask referred to generally in FIG. 5, such as the two-piece mask referred to above. In order to discuss these embodiments more closely, discussion shall now focus solely on the mask with the understanding that the goal is to provide safety during the extension process. Discussion will refer to masks applied over the face of subject 301. FIGS. 7A and 7B show, generically, subject 301 having an upper eyelash 307, a lower eyelash 306, an eyebrow 310, a forehead 309, and an eyelid 308. The lower eyelid of the subject is generally indicated as the region within a dashed line 311. When an eyelid is referred to, it is generally assumed to be the upper eyelid unless specifically noted to be the lower eyelid. In FIG. 7A, the right eye of subject 301 is open, and the left eye of subject 301 is closed. Discussion will refer to both the front view of the mask and various sectional views, as these section views will help to elucidate various features of the masks. These masks are generally symmetric and, unless otherwise stated, should be assumed to have bilateral symmetry that mimics the bilateral symmetry of the human face. Of course, it is possible to have an asymmetric mask in some embodiments where it can be advantageous for specific configurations of a robotic eyelash extension mechanism.

In some embodiments, it is preferred to provide a two-part mask 313 to allow for simpler donning and doffing of mask 313, as shown in FIGS. 8A and 8B. Mask 313 is comprised of an upper mask 314 and a lower mask 315. In practice, subject 301 would don lower mask 315 while their eyes are closed, and then open their eyes, thereby pulling their upper eyelash 307 from under lower mask 315 while leaving their lower eyelash 308 under lower mask 315. Then, subject 301 closes their eyes again and dons upper mask 316, which covers their eyelid 308 and forehead 309. Upper mask 314 registers against the upper edge of lower mask 315, ensuring the correct gap 316 for upper eyelash 307. Mask 313 is held to the head of subject 301 by elastic straps 312 that wrap around the back of subject 301's head. Of course, there are many ways to hold a mask generally onto a person's head, including hooks over the ears, adhesives, connecting the mask to a vacuum supply, and elastic straps among many such solutions. Elastic strap 312 is not shown in other views of two-part mask 313 for clarity.

Figure 9B:
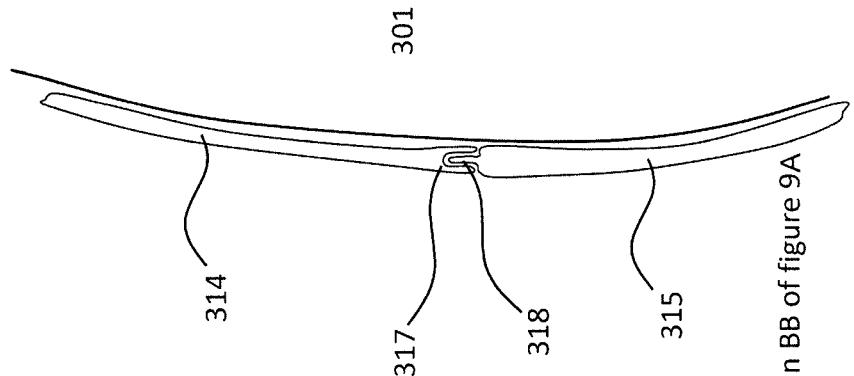
FIG. 9B is a cross section of the two-part mask embodiment of FIG. 9A.
Figure 9A:
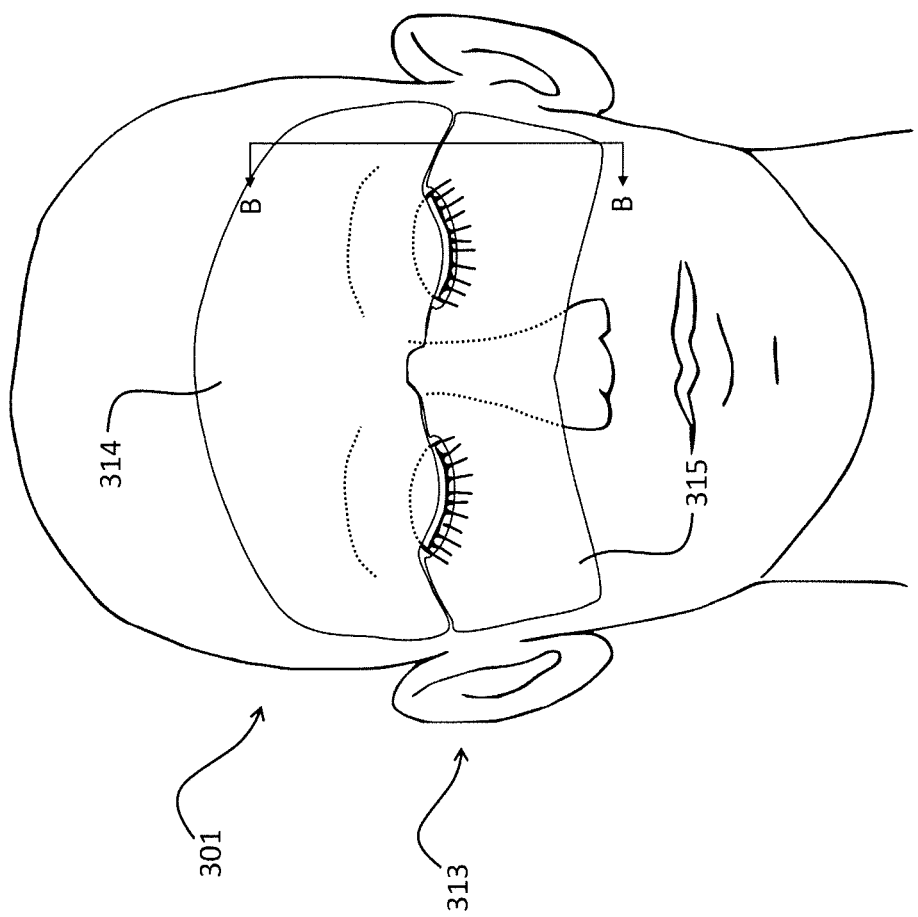
FIG. 9A is a front view of a two-part mask embodiment that includes a tongue and groove connection.
Figure 10B:
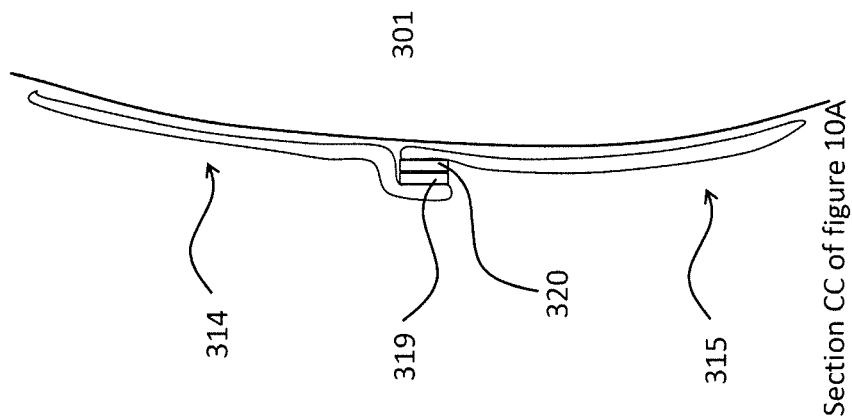
FIG. 10B is a cross section of the two-part mask embodiment of FIG. 10A.
Figure 10A:
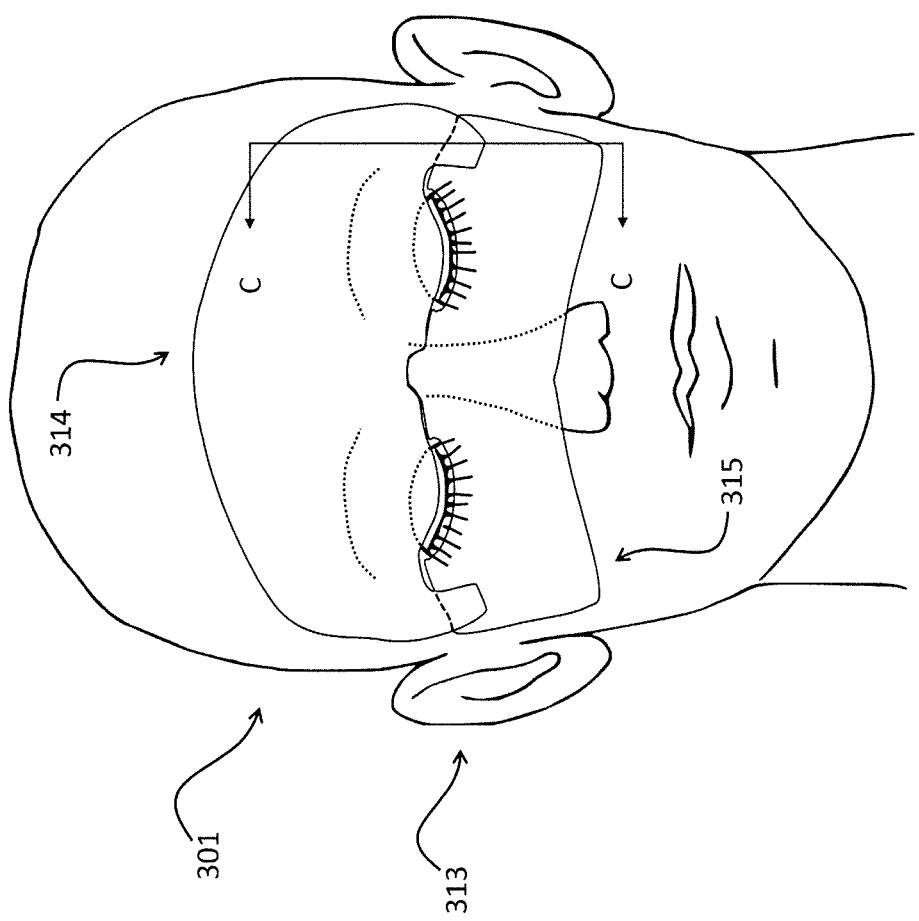
FIG. 10A is a front view of a two-part mask embodiment that includes an overlapping connection made by a magnet.

In some embodiments, such as shown in FIGS. 9A and B, the lower edge of upper mask 314 includes a groove 317 that mates with the upper edge of lower mask 315 over a tongue 318. In other embodiments, such as shown in FIGS. 10A and B, upper mask 314 overlaps lower mask 315, with a magnet 319 adhered to upper mask 314 and magnetic material 320 adhered to lower mask 315, and the resulting magnetic attraction holds upper and lower masks 314, 315 in their correct orientation. There are many other ways known to the art to maintain the respective orientation of upper mask 314 and lower mask 315 including latches, mating features, hook and loop fasteners, elastic straps, hooks, and clips.

Figure 11:
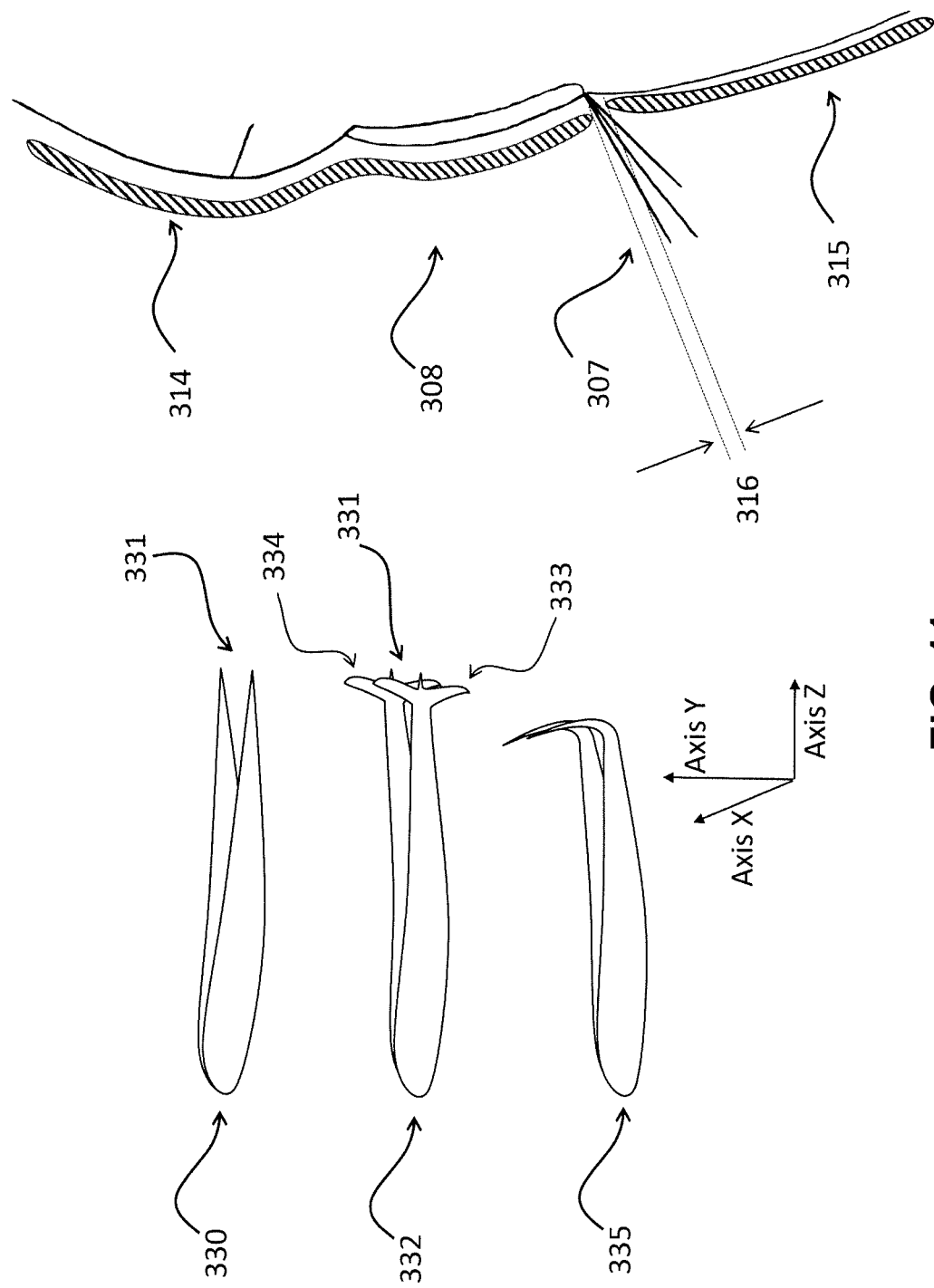
FIG. 11 shows various tweezer arrangements that can be advantageous in conjunction with a mask.
Figure 12:
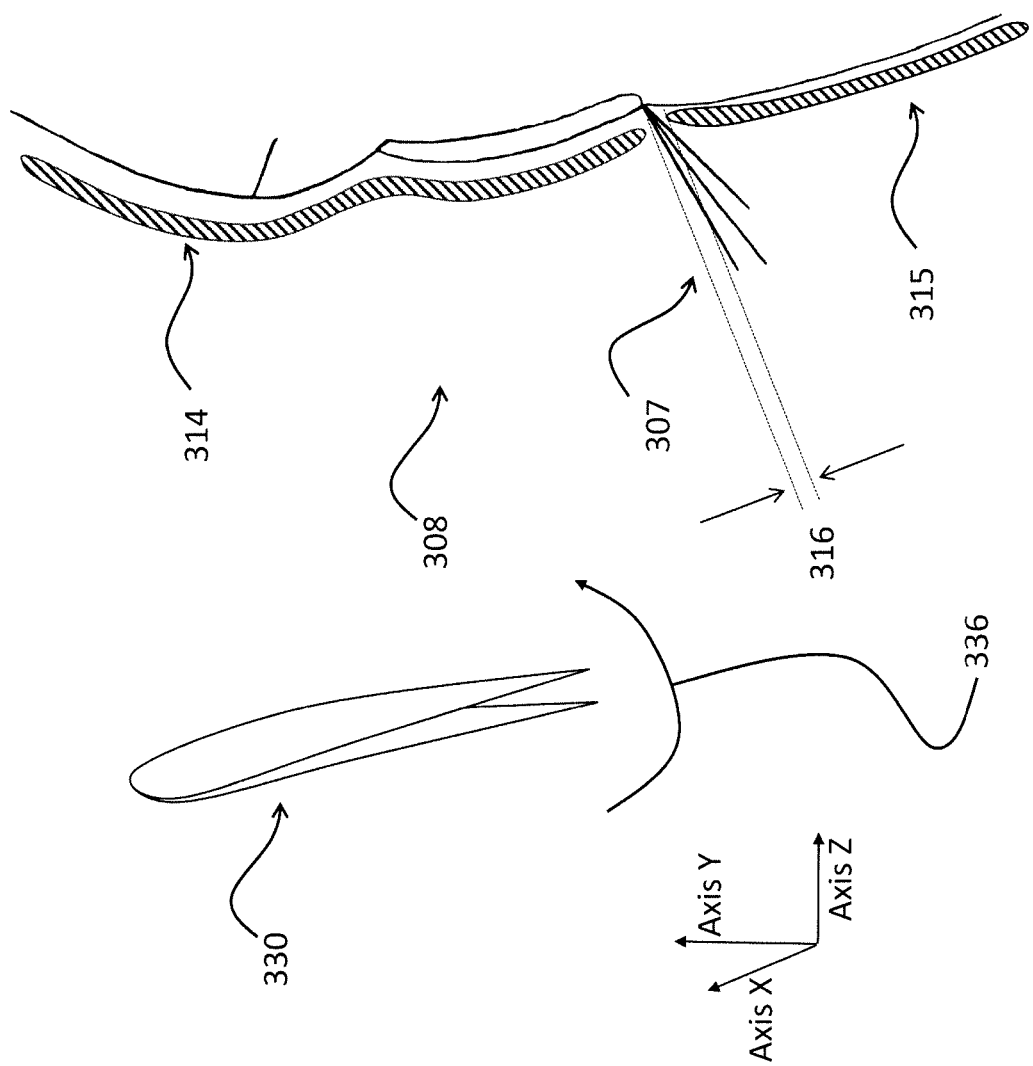
FIG. 12 shows a geometric arrangement of a tweezer with respect to a mask such that the tweezer cannot enter the gap in the mask.

In practice, two-part mask 313 provides safety to subject 301 by allowing the robotic mechanism access to only upper eyelash 307 in gap 316. This safety is complete as long as the robotic mechanism is not strong enough to push through two-part mask 313 or to push apart upper mask 314 and lower mask 315, and as long as no tool or part on the robotic mechanism can fit through gap 316. In practice, this can be guaranteed by adding features to the robotic mechanism. Consider FIG. 11 where the robotic mechanism (not shown) terminates in tweezers 330. Because tweezers 330 have narrow tips 331, they can fit through gap 316. However, if hammerhead tweezers 332 are used in place of tweezers 330, extending features 333 and 334 prevent narrow tips 331 from reaching through gap 316 in all circumstances. There are many possible ways to "grow" a feature from tweezers 330 so that they cannot reach through gap 316, including features from just one side of tweezers 330 (provided that the robot cannot rotate tweezers 330), rings protruding from the sides of tweezers 330, and rods protruding from the sides of tweezers 330. In some embodiments, it can be sufficient to use curved tweezers 335 that cannot fit through gap 316 as long as the robot cannot greatly rotate tweezers 335 about axis X. In still other embodiments, as shown in FIG. 12, it is possible for tweezers 330 to simply be oriented at a sufficiently steep angle so that they cannot align with gap 316. In this case, the robotic mechanism should not be able to greatly rotate tweezers 330 about axis X in the direction of an arrow 336. It is well understood in the field of robotics how to prevent a robot from rotating an end effector such as tweezers 330 more than a desired amount. While sometimes this prevention of rotation can be achieved in software, it can also be accomplished through means of a hard stop or the choice of an actuator that is intrinsically limited in its motion. Still, in some robots, more than one robotic joint can allow for rotation about axis X, making range of motion limits difficult, and this can force a choice of tweezers like hammerhead tweezers 332.

Figures 13A, 13B:
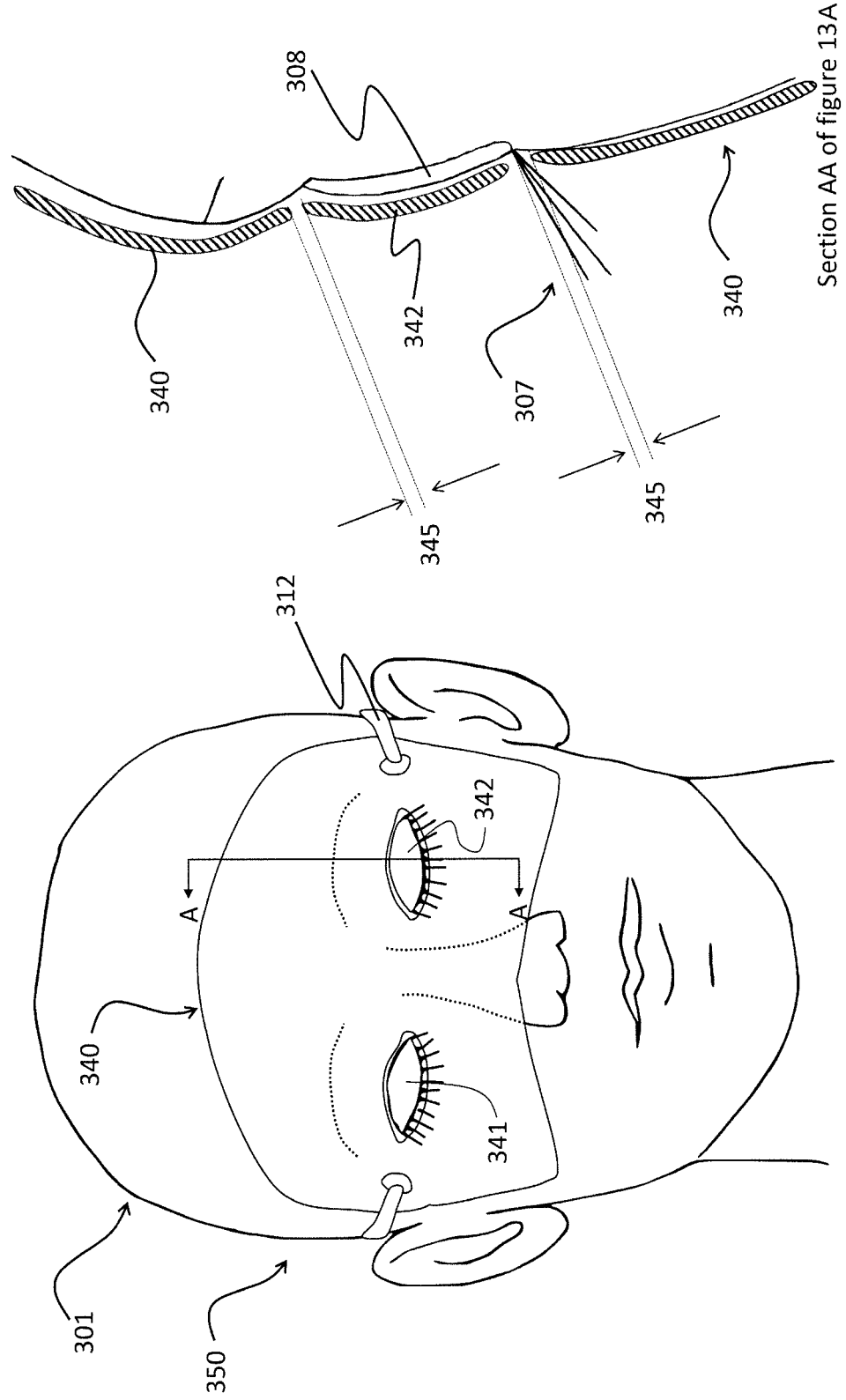
FIG. 13A is a front view of a three-part mask.
FIG. 13B is a cross section of the three-part mask.

In some embodiments, it is preferred to provide a three-part mask 350, including a face mask 340, a right eyelid cover 341, and a left eyelid cover 342. In this embodiment, shown in FIG. 13, face mask 340 covers most of the face of subject 301, leaving openings over the right and left eye of subject 301. The right and left openings of face mask 350 are then mostly filled by right and left eyelid covers 341 and 342 which each sit directly on the respective eyelid 308 of each of the left and right eyes of subject 301. In practice, this produces a circumferential gap 345 around both right and left eyelid covers 341 and 342. This is because each subject 301 will have different spacing of their eyelid 308 from their forehead 309 and three-part mask 350 is not customized to the face of each individual. This results in a variable spacing between face mask 340 and each of right and left eyelid coves 341 and 342 when they are placed on the respective eyelid 308 of the subject. Similar to two-part mask 313, subject 301 closes their eyes before face mask 340 is placed over their face, then opens their eyes so that lower eyelash 306 remains under face mask 340 but upper eyelash 307 is exposed. Subject 301 then closes their eyes, and right and left eyelid covers 341 and 342 are placed on their respective eyelid 308. Also, similar to two-part masks, an elastic strap can be used to hold face mask 340 to the head of subject 301, such as elastic strap 312 shown in FIG. 13. Elastic strap 312 will not be shown in other figures of three-part mask 350 for clarity. As will be discussed later, eyelid covers 341 and 342 can be adhered to each eyelid 308. Additionally, although not shown, in some embodiments eyelid covers can also be clipped or otherwise fastened to face mask 340.

Figure 14:
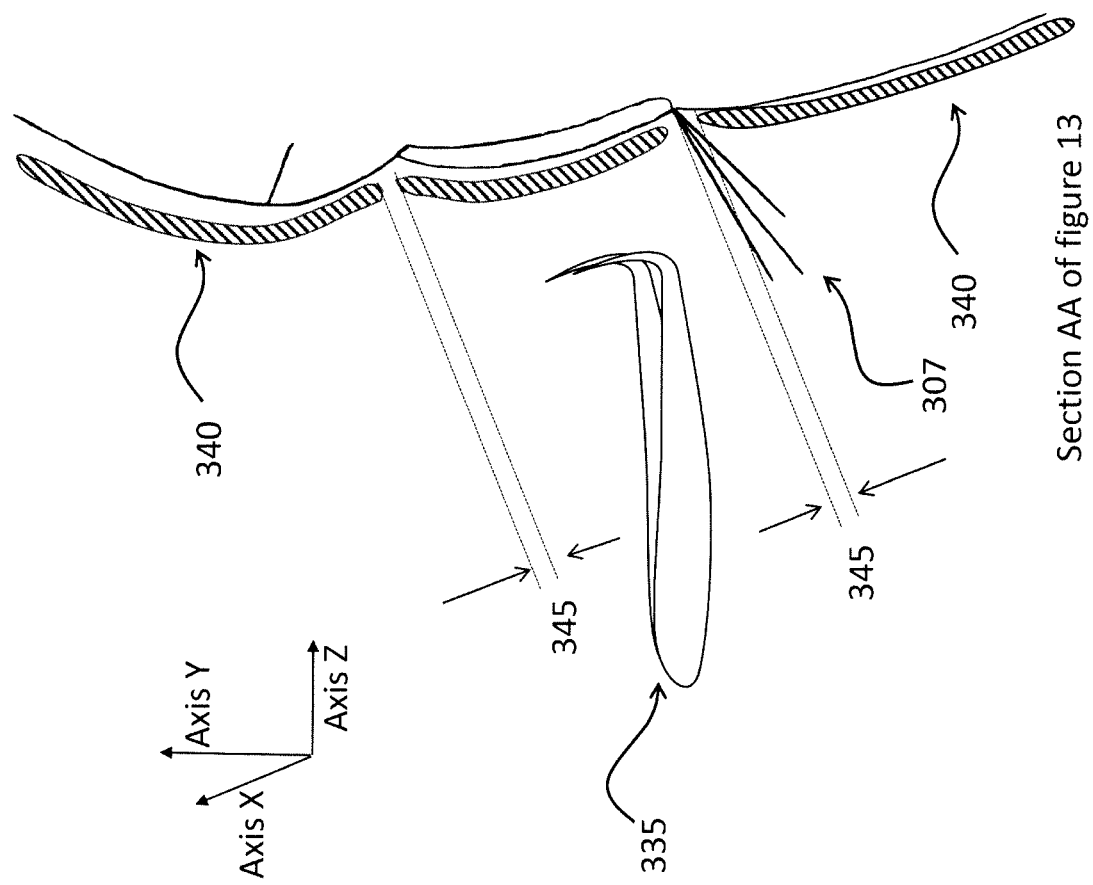
FIG. 14 shows a curved tweezer operating in the vicinity of the three-part mask.

In this embodiment, safety is provided by three-part mask 350 as long as no part of the robotic mechanism can fit through circumferential gap 345. The ways to do this are similar to the previous embodiment of two-part mask 313 but are somewhat more limited because circumferential gap 345 is present in more places than gap 316. For example, tweezers 330 from FIG. 11 could easily extend through circumferential gap 345 in the same way that they could extend through gap 316 but in even more places because circumferential gap 345 is present all around right and left eyelid covers 341 and 342. However, it is still possible to design features such that the tweezers (or any other end effector) cannot reach through circumferential gap 345. For example, curved tweezers 335, as shown in FIG. 14, cannot reach through circumferential gap 345 as long as the robotic mechanism cannot rotate tweezers 335 greatly about axis X. Nevertheless, the forces that can be applied to right and left eyelid covers 341 and 342 will be lower than can be applied to face mask 340 or to the masks in other embodiments because all of the force applied will be transmitted to the eye of subject 301.

In either two-part mask 313 or three-part mask 350, it can be desirable to use tape to additionally hold down lower eyelash 306 so that small movements during the wearing of the mask do not result in lower eyelash 306 coming out from under either mask. In another permutation, it is possible for either two-part mask 313 or three-part mask 350 to come in left and right versions. For example, a mask can be produced either in two or three parts that provides access to only the right eye, and a second mask can be produced that provides access to only the left eye. Such a configuration has the advantage of providing no access to the eye not being worked upon, slightly enhancing safety. Such a configuration, using the design of the three-part mask, is shown in FIG. 15, including a right mask 353 and a left mask 354. This configuration is not preferred because it increases the number of unique mask parts but can be advantageous depending on particulars of the robotic mechanism employed.

It may be reasonable to wonder why three-part mask 350 would ever be preferred if it produces a larger gap around the eye and is tolerant only to smaller forces. There are several advantages to three-part mask 350. First, because eyelid covers 341 and 342 sit directly on eyelid 308, the distance from the outer surface of eyelid covers 341 and 342 to base of eyelashes 355 can be less than when two-part mask 313 is used because two-part mask 313 cannot be made to sit on eyelid 308 (unless it is designed specifically to fit a single individual). For example, consider FIGS. 16A-D, which show section AA for both two-part mask 313 and the presently discussed embodiment of three-part mask 350 for a subject 301A and subject 301B. Subject 301B has a protruding forehead, unlike subject 301A who has a rather flat forehead. Of course, such variation in facial structure and geometry is quite common among various persons, and there could be variations in other facial structure such as the height of the nose bridge from the eyelid. In FIG. 16A, two-part mask 313 fits subject 301A quite tightly, producing a minimal eyelid offset 349 from upper mask 314 to eyelid 308. However, in FIG. 16B, the same two-part mask 313 fits subject 301B rather poorly, producing a large eyelid offset 349 from upper mask 314 to eyelid 308. This will make it difficult for the robotic mechanism to image and access the base of upper eyelash 307. In some cases, such a large eyelid offset 349 could make it impossible to use two-part mask 313. In FIGS. 16C and D, however, it can be seen that three-part mask 350 allows for a minimal eyelid offset 349 with either of subjects 301A and 301B because eyelid cover 342 sits directly on eyelid 308.

Figure 17B:
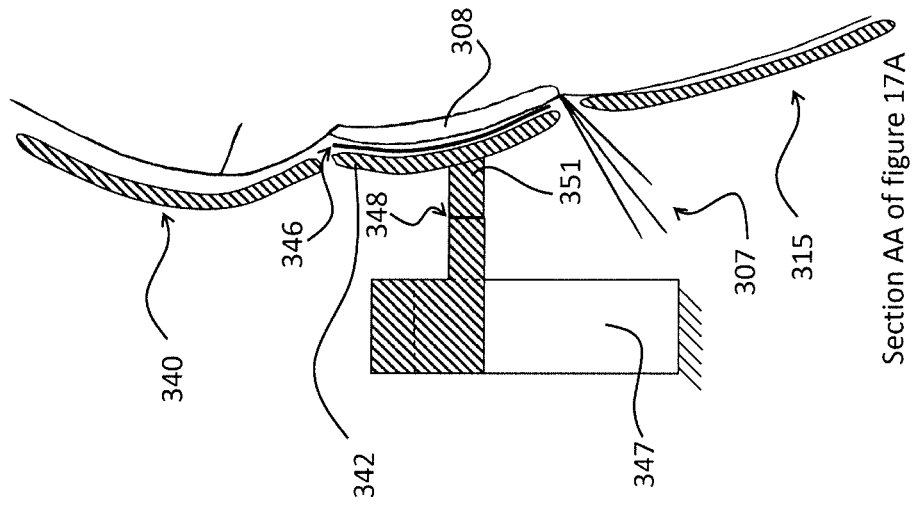
FIG. 17B is a cross section of the three-part mask of FIG. 17A.
Figure 17A:
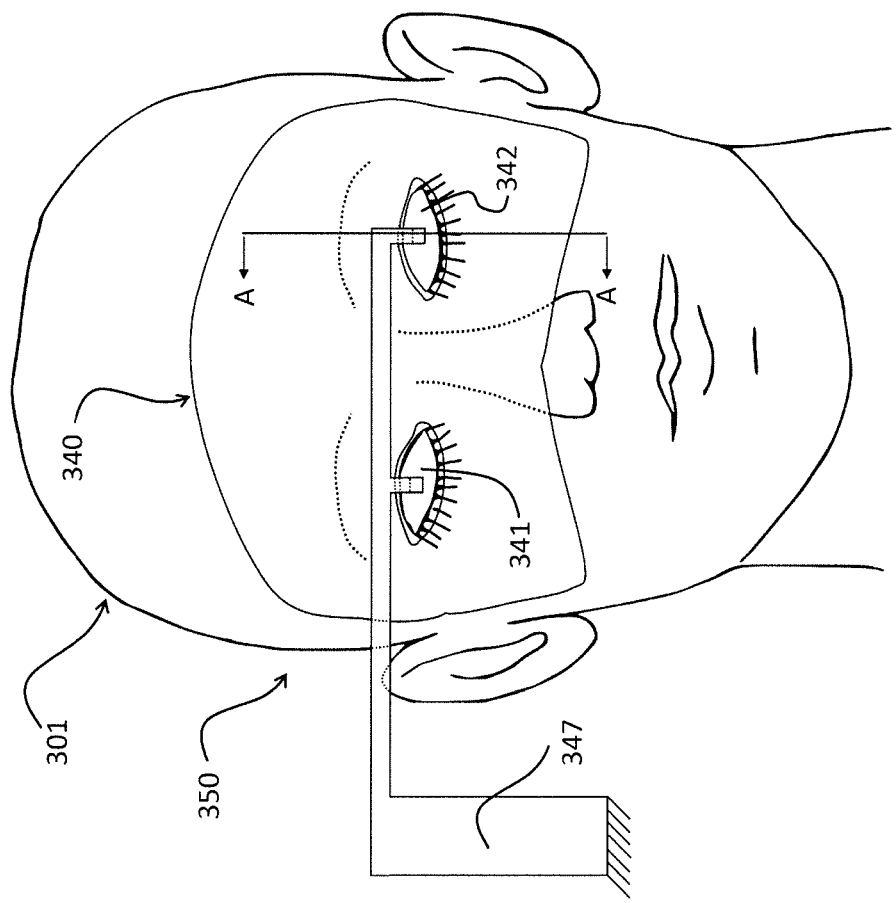
FIG. 17A is a front view of a three-part mask further including a connection to a stable object for the reduction of eyelash flutter.

Although visibility is a good reason to use three-part mask 350, it is not the only reason. Many people experience eyelid flutter when they close their eyes; that is, their eyelids and therefore eyelashes shake uncontrollably. For some persons, the magnitude of the flutter can be larger than the diameter of their eyelashes. This means that when the robotic mechanism is placing extensions, it would have to track subject 301's upper eyelash 307 in real time in order to place extensions. While ways to achieve such tracking are known, they involve more sophisticated robotic and vision systems than would otherwise be required and slow the process of placing lashes, all of which is undesirable. Referencing FIGS. 17A and B, it was found that if eyelid covers 341 and 342 are given a sticky backing 346 (which is sticky on both sides) and gently adhered to eyelid 308 and further connected to a stable object 347, the eyelid flutter will cease, and upper eyelash 307 will be still. This result was unexpected and is thought to be related to the generally compliant connection between human eyelids and human faces—it is easy to hold the eyelid still because the eyelid is not tightly held by the person's own body. In some embodiments, such as shown in FIGS. 17A and B, stable object 347 comprises a ground-referenced fixed object. However, in other similar embodiments, stable object 347 can be tied to the head of subject 301, or in other embodiments, stable object 347 comprises the frame holding the robotic mechanism. It was generally found that it is preferred to make stable object 347 the same structure to which the robotic mechanism is fixed, and that this structure should be generally motionless and tied to ground. This combination provides the least motion of upper eyelash 307 as perceived by the robotic mechanism. However, other embodiments can be preferable depending on how the robotic mechanism is connected to subject 301. Additionally, it was found to be advantageous to provide a breakaway connection 348 between eyelid covers 341, 342 and stable object 347. Breakaway connection 348 will disconnect if the force needed to hold eyelid cover 341 and 342 in place becomes large—for example, if subject 301 moves their head suddenly. In the preferred embodiment, shown in FIGS. 17A and B, breakaway connection 348 comprises a breakaway magnet 351 that sticks to stable object 347. For this to work, stable object 347 should be made of a material attracted to magnets such as iron and many steels. In some embodiments, stable object 347 can be made of another material provided there is an appropriately magnetically attractive material such as iron provided to interface with breakaway magnet 351. However, breakaway connection 348 can be comprised of hook-and-loop material, or another adhesive connection, among many other ways known in the art.

Figure 18:
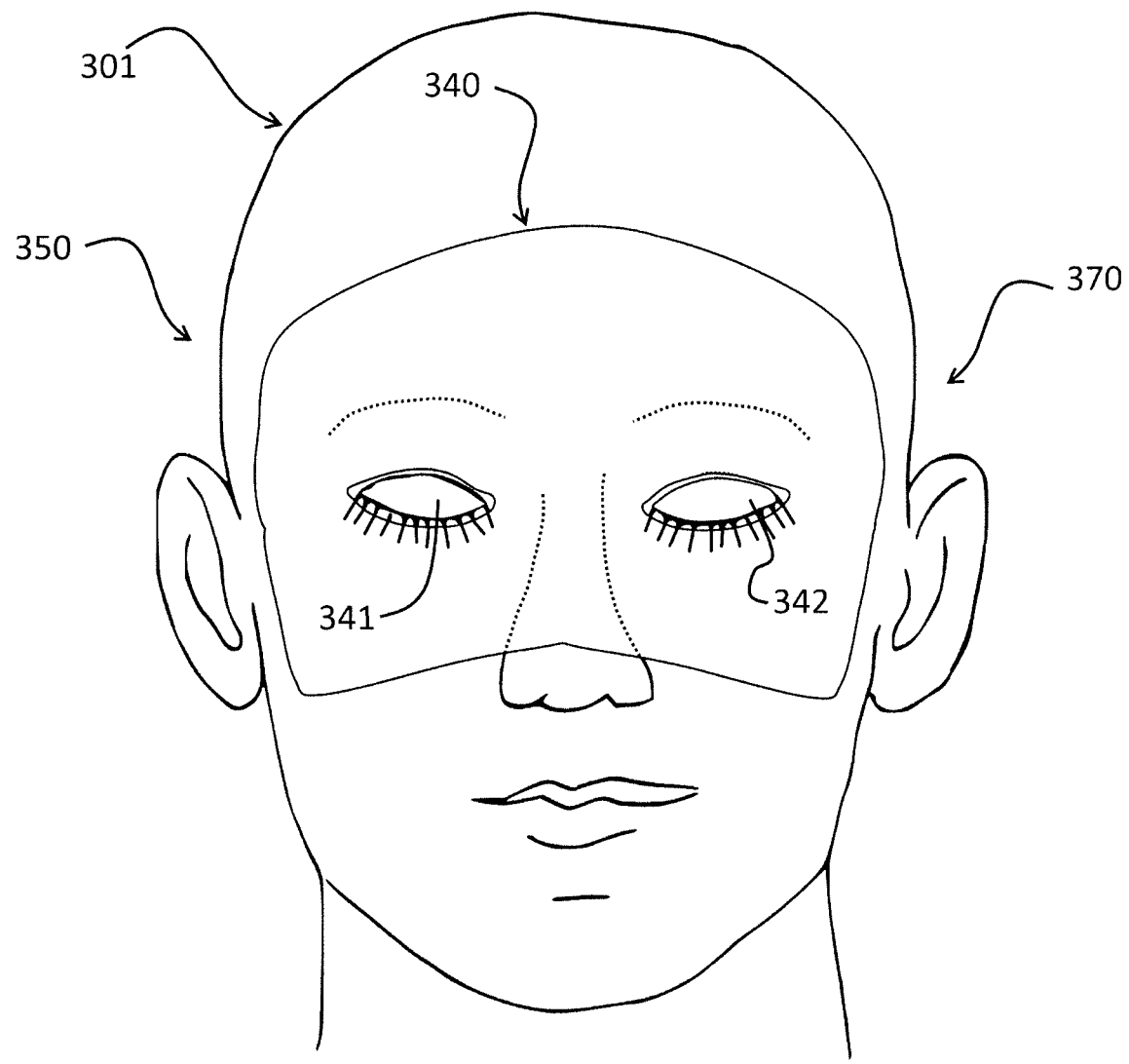
FIG. 18 shows an embodiment of the three-part mask made of a flexible material.

In another embodiment, some or all of two-part mask 313 and three-part mask 350 can be comprised of flexible tape 370, as shown in FIG. 18, rather than a rigid or semi-rigid plastic. This is desirable because flexible tape 370 can conform to the face of subject 301, reducing potential interference with the robotic mechanism and improving visibility for a vision system 360. In some embodiments, flexible tape 370 is puncture resistant or fiber reinforced to increase strength against any impact from the robotic mechanism. While the forces that tape 370 will be able to absorb are less than a rigid structure, for some designs of the robotic mechanism, they will be sufficient to ensure safety. This embodiment is further advantageous because tape is typically used to hold lower eyelash 306 during a manual extension process, and subject 301 may be accustomed to this use of tape. In this embodiment, tape 370 is adhered to the skin of subject 301, and no elastic strap is required to hold tape 370 in place.

In another embodiment, the mask is customized to fit an individual. This can be used as another solution to minimize the eyelid offset between the eyelid of the subject and the mask, much like three-part mask 350. This works to minimize the offset because, of course, it is possible to tightly fit a custom designed mask to the contour of the face of an individual client. Building a custom fit mask can be done in several ways. In one approach, using traditional methods, a casting of the face of subject 301 can be taken. This casting can be used directly or used to make a negative mold that would then, in turn, be used to make a positive mask. Such processes are well known in the art of mask making, especially for costume and special effects. However, these methods are time consuming and require skilled artisans to produce clean results.

Figure 19:
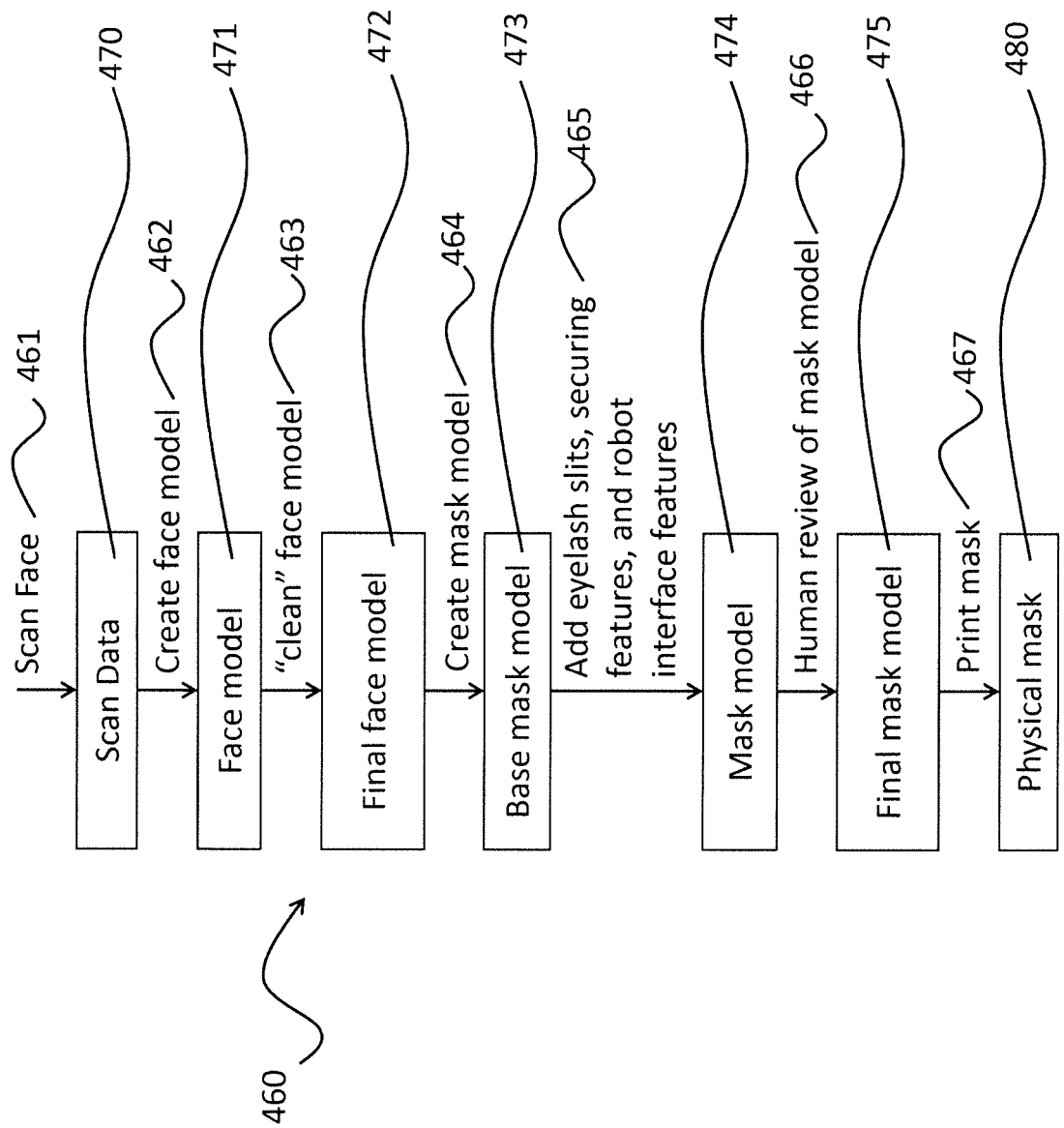
FIG. 19 is a flow chart showing how a custom-fit mask can be made.

In the preferred embodiment of making a custom mask 480, modern scanning and printing technology is used. FIG. 19 shows a process 460 for producing a custom mask. The face of subject 301 is scanned using a three-dimensional (3D) scanner in a scan face step 461 to produce scan data 470. There are a number of suitable scanners now available, often at low cost, through the use of time-of-flight measurements or other 3D scanning technologies. For example, the Structure® Sensor made by Occipital®, Inc. of Boulder, Colo. is one such sensor. Another is the Sense™ 3D from 3D Systems® of Rock Hill, S.C. Scan data 470 is then used to produce a face model 471 of the face of subject 301 in a create face model step 462. Many computer aided design systems well known in the art are capable of producing a computer model from a facial scan; such software is generally provided with a 3D scanner. This software can also automatically "clean" the face model in a "clean" face model step 463—filling any voids and remove erroneous data points from the computer model of subject 301's face to produce a final face model 472. Then, the computer creates a base mask model 473 in a create mask model step 464 by growing a mask from the surface of the "clean" face model produced in step 463. Next, additional features such as eyelash slits, features to secure the mask to the head (e.g., for an elastic band), and features to connect to the robot (e.g., a post grown off the front of the mask) are automatically added in a step 465 to produce a mask model 474. In the most general case, a technician can be used to ensure that mask model 474 is properly designed in a human review of mask model step 466. However, in some embodiments, it is possible for mask model 474 to be automatically checked without a human, thereby automating step 466. This final review produces a final mask model 475 that is ready for printing. An additive manufacturing process like 3D printing is used to print custom mask 480. Many 3D printers are known in the art that would be suitable, for example a Fortus® 380mc manufactured by Stratasys® of Eden Prairie, Minn. has sufficient print volume for custom mask 480. In some embodiments, this printing is done off site, and mask 480 is not ready until delivered to a site for use with subject 301. However, some newer 3D printers are fast enough that printing can be done onsite while subject 301 waits.

This embodiment has great advantages since custom mask 480 will fit subject 301 very exactly, be rigid (and therefor provide good safety protection), and give good visibility to vision system 460. However, there are considerable disadvantages to this embodiment, primarily additional time and cost. Using the 3D scanner to scan subject 301, then modifying computer model 482, and then printing custom mask 480 will take considerable time in the salon or cause subject 301 to wait for delivery of mask 480. Additionally, printing custom mask 480 can be expensive, and mask 480 should be stored after use. Because of this time and cost, this is not seen to be the preferred embodiment, except possibly as a premium service.

While the previous embodiments are generally targeted to work with a robotic mechanism that is performing the extension process, the mask designs presented herein are generally applicable to providing safety for conventional eyelash extension. For example, custom mask 480 can be used for a subject who is receiving eyelash extensions from a cosmetologist so as to reduce the chance of any injury or to provide a hand rest for the cosmetologist during the procedure.

In yet another embodiment of the invention, protection from the mask is only provided around the soft parts around the eye: on the eyelid, just above the eyelid, and just below the eye. These areas are referred to here as "soft" because they are covering the eye socket, and there is no bony skull just under the surface, unlike the forehead and upper cheek of the human. Therefore, in the event that the robot is very weak, and perhaps just barely able to penetrate the skin, these may be the only areas where protection is desirable. For example, it is easy to imagine a set of light plastic tweezers used by a very weak robot that cannot cause more than minor injury to the forehead but might still be capable of causing real injury to the eyelid (or the eye under the eyelid).

Figure 20B:
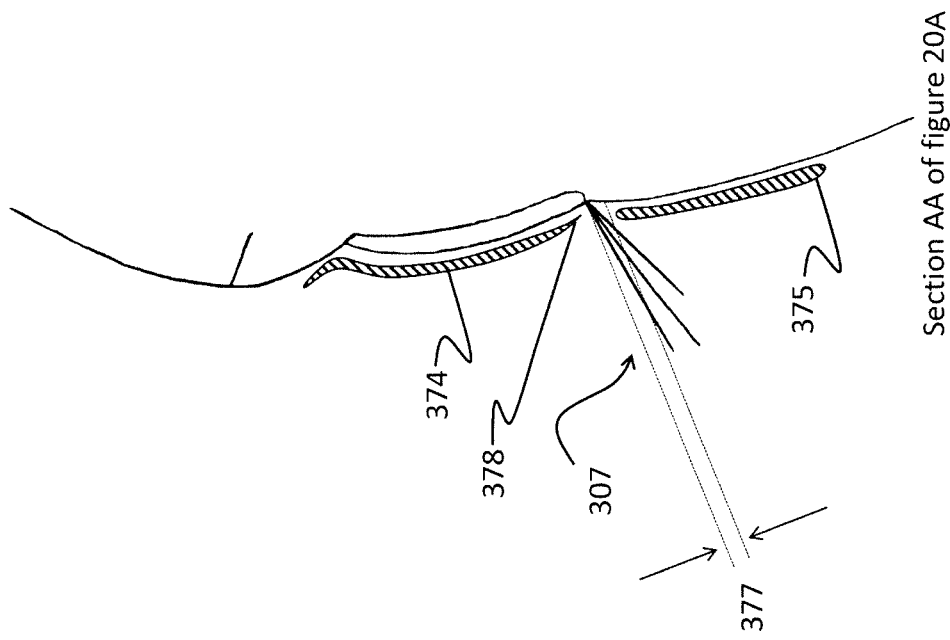
FIG. 20B is a cross section of the adhesive mask of FIG. 20A.
Figure 20A:
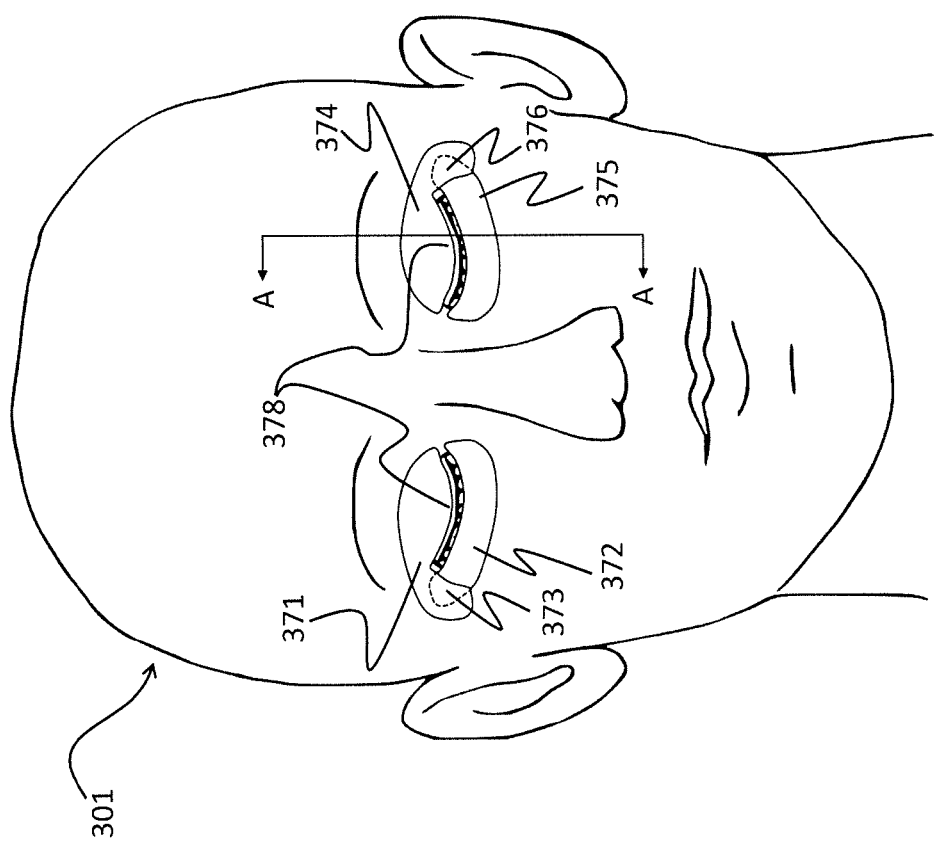
FIG. 20A is a front view of an adhesive mask that is adhered to the eyelid and area below the eye.

In such a case, an embodiment as shown in FIGS. 20A and B can be used. Here, an upper right adhesive mask 371 covers the right eyelid including just above eyelid, and a lower right adhesive mask 372 covers the area just below the eye. Upper and lower right adhesive masks 371 and 372 overlap at the right corner of the eye at a right adhesive mask connection 373. Right adhesive mask connection 373 comprises an adhesive, hook and loop, magnetic connection, or one of any similar light connection between the upper and lower portions of the mask. Connecting the upper and lower portions helps stabilize the eyelid against flutter. The left side includes the same components in mirror image—upper and lower left adhesive masks 374 and 375 that connect through a left adhesive mask connection 376. The four mask portions can be made of a thin plastic that is semi rigid, such as polyethylene, nylon, or ABS, or a flexible rubber material. Furthermore, if the robotic mechanism and end effector is of particularly safe design, all or part of the mask portions can be constructed of a textile material infused with a lotion such as the current "gel pads" used on the lower lid during the manual eyelash extension process. In practice, thicknesses on the order of 0.5 to 2 mm allow for thin masks that nonetheless provide reasonable protection. In some embodiments, one or more parts of the mask are tapered near the eyelash in order to allow for better visibility of the root of the eyelash. For example, in FIGS. 20A and B, left and right upper adhesive masks 371 and 374 have tapered edge 378. It can also be desirable to provide multiple sizes of masks in order to accommodate persons with different width eyelashes and different eye socket geometries. However, it has generally been found that the upper and lower adhesive mask topology shown in FIGS. 20A and B will fit a wide range of persons and that only a few sizes are usually required. The masks can be adhered to the person with any biocompatible adhesive of moderate strength. It is important not to use too strong of an adhesive (or the mask cannot be removed comfortably) nor to weak of an adhesive (or the mask will fall off during use). There are many suitable kinds of adhesive, including, for example, Jobst® "It Stays!"® adhesive produced by BSN Medical® of Charlotte, N.C.; Pros-Aide® Adhesive by ADM Tronics™ Unlimited, Inc. of Northvale, N.J.; SoftWear® by Adhesives Research® Inc. of Glenn Rock, Pa.; Skin Tac® by Torbot® Group, Inc. of Cranston, R.I.

Figure 21B:
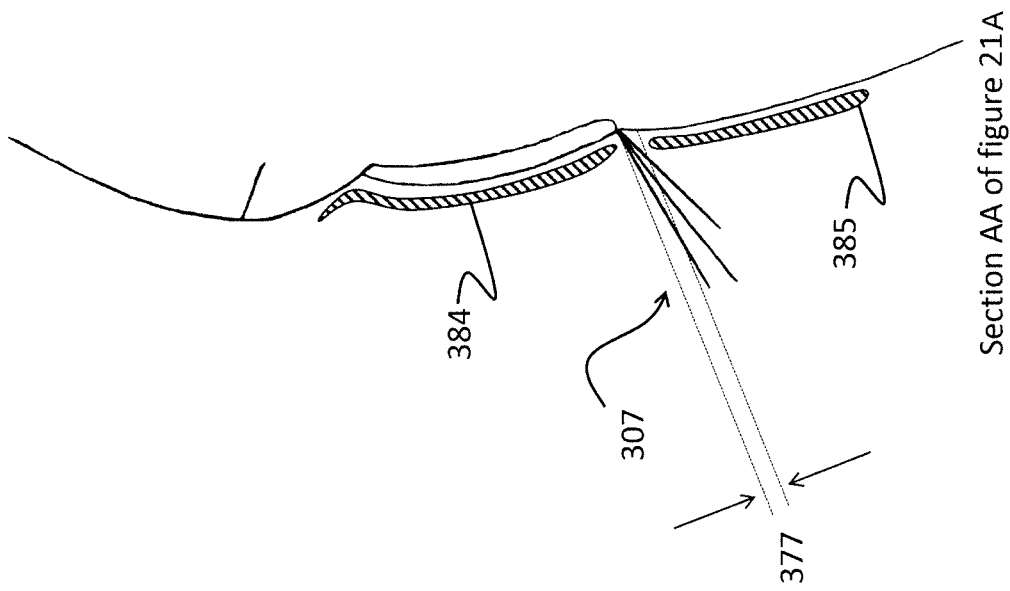
FIG. 21B is a cross section of the adhesive mask of FIG. 21A.
Figure 21A:
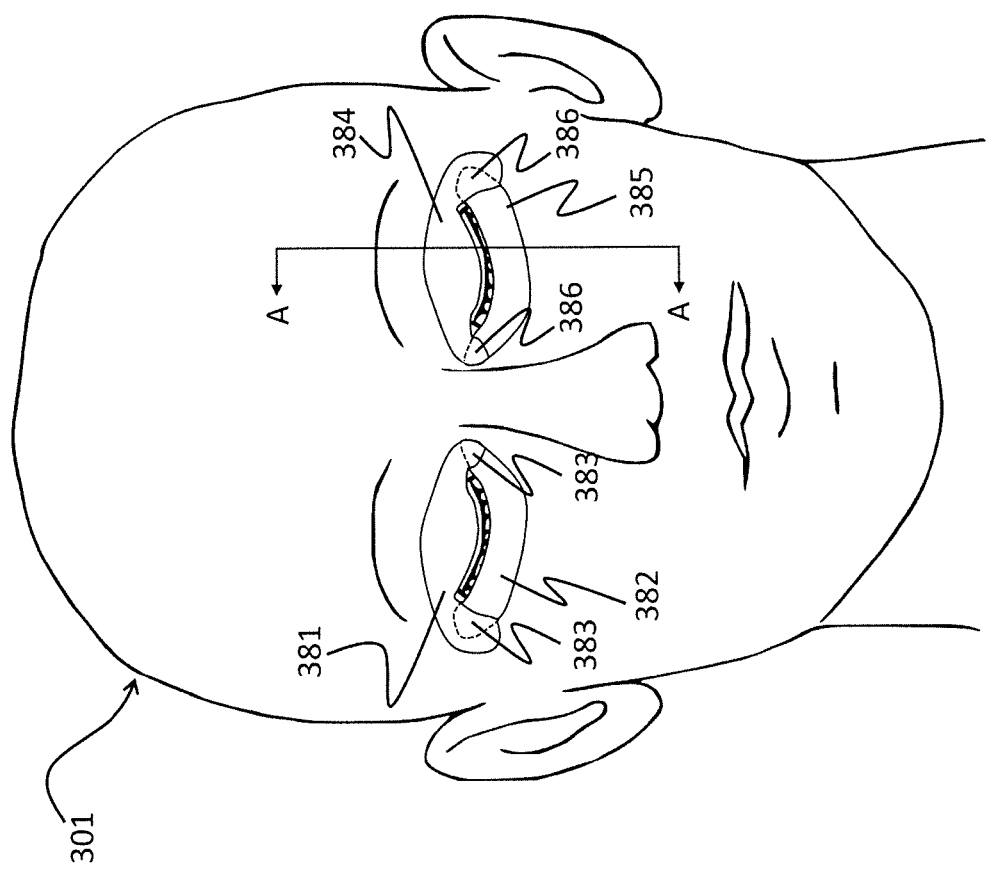
FIG. 21A is a front view of an adhesive mask similar to that of FIGS. 20A and B, further including connections on both the inside and outside of the eye.

A slight permutation of the previous embodiment is shown in FIGS. 21A and B. Here upper and lower right adhesive masks 381 and 382 overlap at both the inner and outer corners of the eye at right adhesive mask connections 383. Similarly, on the left side, upper and lower left adhesive masks 384 and 385 connect through left adhesive mask connections 386. That is, the only difference in FIGS. 21A and B is that the adhesive masks connect in two places. This embodiment can provide greater structural connection between the upper and lower masks, which is helpful in reducing eyelid flutter. Of course, it is further possible to anchor the combined mask to a stable object such as described above.

Another slight permutation of the previous embodiment is shown in FIGS. 22A and B. Although shown with overlap at both inner and outer corners of the eye, the solution shown is compatible with either of the two previous embodiments. Here, an extended lower right mask 392 and an extended lower left mask 395 extend further down the cheek of subject 301. This confers an advantage in that more of the cheek of subject 301 is covered. In addition, eyelash 307 of subject 301 will generally be viewed by a robotic mechanism or by a person from above the head, and extending the lower mask further down the cheek can be advantageous in providing a larger area of uniform color for sighting eyelash 307. This is particularly advantageous in the case of automatic eyelash extension that is done by a robotic mechanism because the algorithms used for computer vision can be more sensitive to variations in color than a human. Indeed, in FIG. 22B, extended lower left mask 395 lifts away from the cheek of subject 301 along the lower side so as to provide an even longer apparent section when viewed from above.

Figure 23:
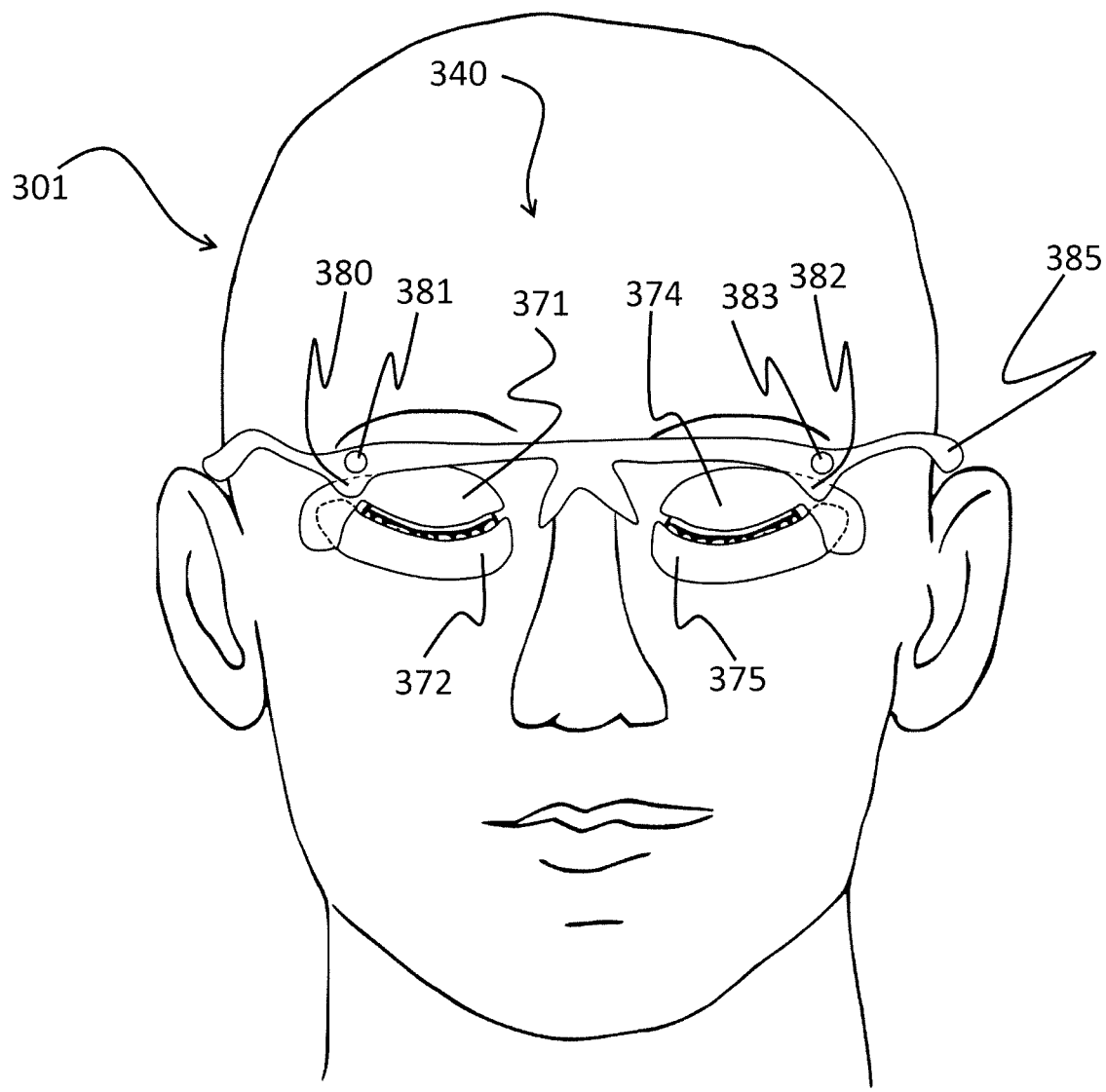
FIG. 23 shows an adhesive mask including anchoring frames that can help reduce eyelash flutter.

In some embodiments, in order to further reduce eyelid flutter, it is desirable to anchor the flexible mask to the robot or a stable location, similar to the systems discussed above in connection with FIGS. 17A and B. With reference to FIG. 23, subject 301 is wearing the same basic right and left upper and lower masks as referenced in FIGS. 20A and B. However, in addition, subject 301 is also wearing anchoring frames 385. Anchoring frames 385 are similar to glasses frames, resting over the ears and nose of subject 301 like a normal pair of glasses without any lenses. However, anchoring frames 385 also include right and left adhesive mask anchors 380 and 382 respectively that couple anchoring frames 385 to upper right and upper left adhesive masks 371 and 374 respectively. Similar to the connection between upper and lower adhesive masks, right and left adhesive mask anchors 380 and 382 can be made with adhesive, hook and loop, or magnetic connection, or any other low-profile connection. Further, anchoring frames 385 include right and left latches 381 and 383, which latch anchoring frames 385 to the robot. In this embodiment, the latches are shown as simple magnets, which is sufficient if the robot includes mating magnets or magnetic material, but of course any number of connections are possible. The advantage of this embodiment is that subject 301 can don anchoring frames 385 and connect them to the adhesive masks before approaching the robot, simplifying the donning process. However, in some embodiments, it can be sufficient to dispense with anchoring frames 385 and simply provide mating features for right and left adhesive mask anchors 380 and 382 on the robot.

Other Safety Strategies

In many of the aforementioned embodiments, it can be helpful to know that the mask is in place. For example, in embodiments where a robotic mechanism is placing the eyelash extensions, it is helpful to verify that all parts of the mask are present. Although it is possible that this can be achieved by inspection with a computer vision system, it can be desirable to provide a more fail-safe method since the goal of providing a mask is partially to provide fail-safe safety. In the simplest embodiments, where all parts of the mask overlap, such fail-safe verification can be achieved by providing that the connections between parts of the mask have conductive connections, that the masks themselves are conductive, and with a first and last portion of the mask returning the conductive path to a circuit that enables the robotic mechanism when the conductive path is closed. This way, if any portion of the mask is disconnected, the conductive path will open and disable the robot. Of course, one skilled in the art of robotics and automatic machinery will note that there are many ways to develop such a circuit, including the use of capacitive or inductive measurements or some combination of these rather than resistive measurements to confirm connection. In some embodiments, like that shown in FIGS. 9A and B, there are no overlapping tabs and extra connecting straps should be provided. In other embodiments, like that shown in FIG. 23, it is not conveniently possible to touch each portion of the mask just once, and so here too connecting straps should be used. Alternatively, it is possible to use a loop back circuit that includes, for example, a resistor in the last portion of the conductive path and mask to verify the connection of that chain of mask. For example, in FIG. 23, a resistor can be placed in right lower mask 372, with a connection to either side of the resistor passed first to right upper mask 371, then to anchoring frames 385, and from there to the robotic mechanism that can only be enabled if the resistance of the resulting circuit indicated that it was closed through the resistor.

In another means of achieving safety, it is possible to provide an interlock similar to that described above but that checks for a path between the tweezers or other end effector provided by the robotic mechanism and the mask and halts the robot in this case. Here, the goal is to halt the robot if it unintentionally touches the mask and is therefore unacceptably close to the subject. Of course, in this case, the circuit should recognize that the connection is a condition for disabling the robot and a disconnection is a condition for enabling the robot, but safety critical circuits for reversing the logic in this way are well understood in the art. In some embodiments, this circuit can rely on capacitive sensing or inductive sensing rather than resistive measurements, or some combination of these.

In another embodiment, a mask is not necessary, and the robot safety is provided purely by the interlock described above. That is, if the robot tweezers or end effector is too close to the subject, or touches the subject, robot motion is halted. In some embodiments, this can constitute removing power to the robot, while in other embodiments, brakes are used to cease motion of the robot. This approach places greater demand on the interlock system but can result in a simpler system design because no mask is required. Nevertheless, this embodiment will not stabilize the eyelashes, which is an advantage to many of the mask designs such as those shown in FIGS. 21A and B.

Figure 24:
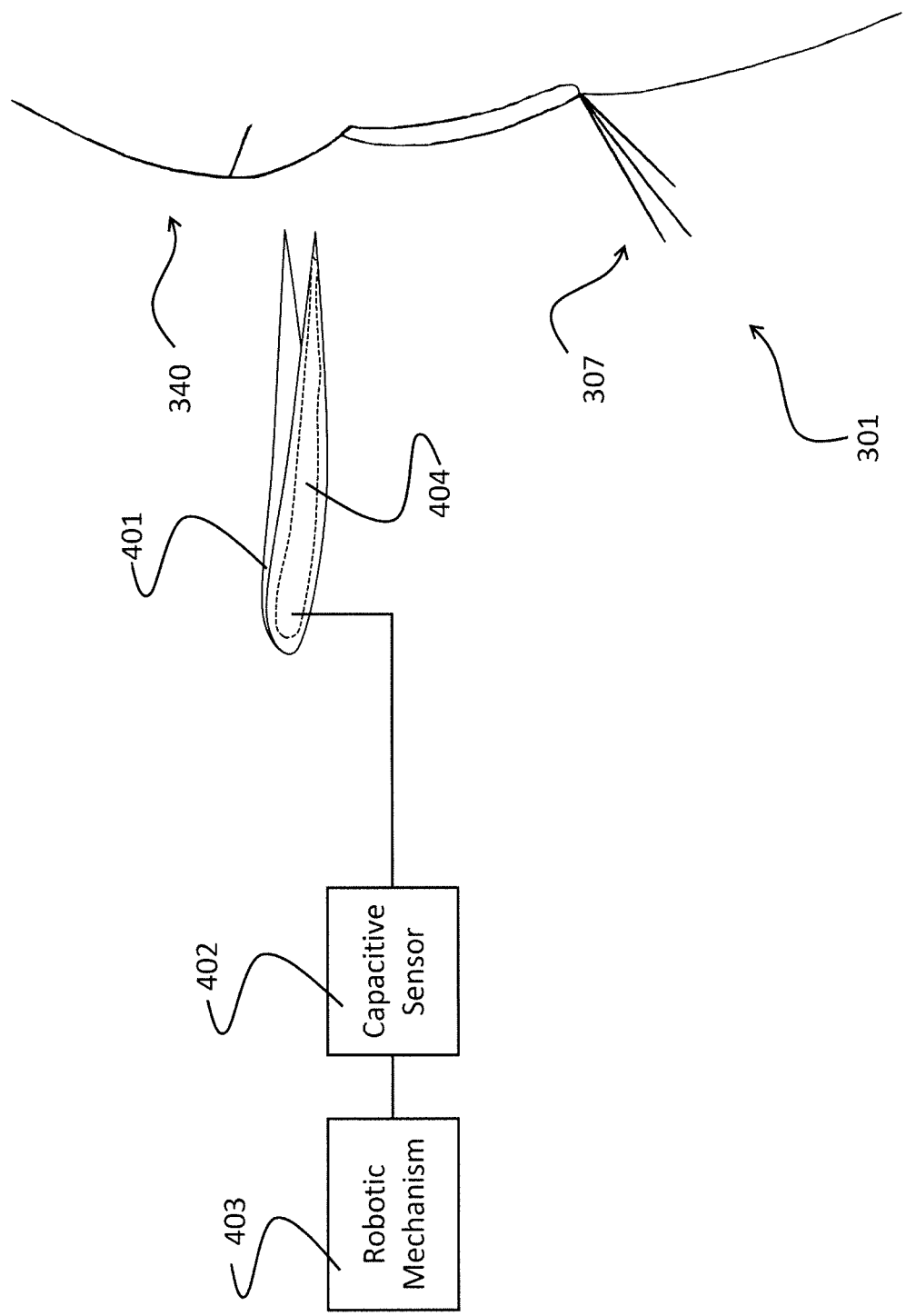
FIG. 24 shows a capacitive safety system that does not require a mask.

As an example of this embodiment, consider FIG. 24 comprising subject 301 and sensed tweezers 401. It is understood that sensed tweezers 401 are being manipulated by a robotic mechanism 403, although the physical form of robotic mechanism 403 is not shown in FIG. 24 to preserve clarity. Sensed tweezers 401 are electrically connected to a capacitive sensor 402. In order to allow sensed tweezers 401 to better act as an antenna, an antenna area 404 can be incorporated as part of sensed tweezers 401. This can be particularly important if sensed tweezers 401 are made of a nonconductive material that would make for a poor antenna. Although antenna area 404 can be part of the surface of sensed tweezers 401, it can also be a separate physical surface which protrudes from tweezers 401, especially if antenna area 404 uses a complex geometry that could not fit on sensed tweezers 401. Capacitive sensor 402 can be one of any number of circuits well known in the art of sensing capacitance. For example, many integrated circuits are cheaply available that provide capacitive sensing, such as the IQS127D produced by Azoteq™ of Pretoria, South Africa. Capacitive sensor 402 will then provide a signal to robotic mechanism 403 indicating the distance between sensed tweezers 401 and subject 301. In some embodiments, this signal can be a continuous measurement, and in others, it can be as simple as a single high/low signal indicating if the distance has fallen below a safe threshold. In the preferred embodiment, this signal should be fail safe so that if the electrical connection to capacitive sensor 402 fails or capacitive sensor 402 fails, the signal will indicate a distance that is less than any safe threshold.

In some embodiments, the same device may be used to provide safety for extending eyebrows rather than eyelashes, as eyebrows have rather similar properties to eyelashes. In this embodiment, the gap in the mask would be provided around the eyebrow rather than the eyelash.

Based on the above, it should be readily apparent that the present invention provides a way to more effectively install eyelash extensions, which reduces both the time and the cost of doing so. The systems and methods of the present invention are demonstrably safe so that recipients of the extensions are confident in the procedure. Although described with reference to preferred embodiments, it should be readily understood that various changes or modifications could be made to the invention without departing from the spirit thereof. In general, the invention is only intended to be limited by the scope of the following claims.

The invention claimed is:

1. A mask configured to provide protection to a subject undergoing eyelash extension, the mask comprising:
    an upper eyelid cover configured to cover an upper eyelid of the subject having upper eyelashes, the upper eyelid cover comprising a top edge and an opposing bottom edge configured to correspond with a base of the upper eyelashes; and
    a lower eyelid cover configured to cover a lower eyelid of the subject, the lower eyelid cover comprising an upper edge and an opposing lower edge, the upper edge being complementary in shape to the bottom edge of the upper eyelid cover;
    wherein the upper and lower eyelid covers are configured to be connected to one another at a corner of the corresponding eye and to form a gap between the upper edge of the lower eyelid cover and the bottom edge of the upper eyelid cover, the gap being configured to expose at least one eyelash of the subject without exposing a corresponding eye of the subject.

2. The mask of claim 1, wherein at least one of the upper and lower eyelid covers is configured to adhere to the face of the subject.

3. The mask of claim 1, wherein the upper eyelid cover is configured to adhere to the upper eyelid of the subject, and the upper eyelid cover includes a fastening connection configured to couple the upper eyelid cover to an anchor.

4. The mask of claim 3, wherein the anchor is a head of the subject, a fixed object or a robotic eyelash extension system.

5. The mask of claim 3, wherein the fastening connection includes a breakaway connection configured to disconnect when a head of the subject is displaced relative to the anchor.

6. The mask of claim 1, wherein each of the upper and lower eyelid covers is configured to adhere to the skin of the subject.

7. The mask of claim 6, further comprising a second upper eyelid cover configured to cover a second upper eyelid of the subject and a second lower eyelid cover configured to cover a second lower eyelid of the subject, wherein each of the second upper and lower eyelid covers is configured to adhere to the skin of the subject, the second upper and lower eyelid covers are configured to be connected to one another, and the second upper and lower eyelid covers are configured to form a second gap over at least one other eyelash of the subject when connected to one another.

8. The mask of claim 6, wherein at least one of the upper and lower eyelid covers includes a fastening connection configured to couple to an anchor.

9. The mask of claim 8, wherein the anchor is a head of the subject, a fixed object or a robotic eyelash extension system.

10. The mask of claim 8, further comprising a set of anchoring frames configured to rest on the ears and nose of the subject, wherein the set of anchoring frames comprises the anchor, and the set of anchoring frames is further configured to be selectively coupled to a second anchor.

11. The mask of claim 1, wherein the mask is configured to correspond to and follow a specific geometry of the face of the subject, the specific geometry determined through three-dimensional scanning of the face of the subject.

12. The mask of claim 1, wherein the mask is configured to follow a contour of a face of the subject.

13. A method of protecting an eye or stabilizing an eyelid of a subject undergoing eyelash extension with a mask including an upper eyelid cover configured to cover an upper eyelid of the subject having upper eyelashes, the upper eyelid cover comprising a top edge and an opposing bottom edge configured to correspond with a base of the upper eyelashes, and a lower eyelid cover configured to cover a lower eyelid of the subject, the lower eyelid cover comprising an upper edge and an opposing lower edge, the upper edge being complimentary in shape to the bottom edge of the upper eyelid cover, the upper and lower eyelid covers being configured to be connected to one another at a corner of the corresponding eye and to form a gap between the upper edge of the lower eyelid cover and the bottom edge of the upper eyelid cover, the method comprising:
    aligning the mask to the subject; and
    adhering the mask to the face of the subject, with the gap exposing at least one eyelash of the subject without exposing a corresponding eye of the subject.

14. The method of claim 13, further comprising choosing an appropriate size for the mask from among at least two sizes.

15. The method of claim 13, further comprising using a fastening connection to couple the mask to an anchor.

16. The method of claim 15, wherein the anchor is a head of the subject, a fixed object or a robotic eyelash extension system.

17. The method of claim 13, further comprising:
    fastening at least one of the upper and lower eyelid covers to a first anchor which is part of a set of anchoring frames resting on the ears and nose of the subject; and
    coupling the set of anchoring frames to a second anchor.

18. The method of claim 13, further comprising scanning the face of the subject three-dimensionally to obtain a specific geometry of the face of the subject, wherein the mask is configured to correspond to and follow the specific geometry.

* * * * *